(12) United States Patent
Ueda et al.

(10) Patent No.: US 8,233,937 B2
(45) Date of Patent: Jul. 31, 2012

(54) INFORMATION PROCESSING APPARATUS, COMMUNICATION CONTROL METHOD, STORAGE MEDIUM WITH PROGRAM STORED THEREIN, AND INFORMATION PROCESSING SYSTEM

(75) Inventors: Mitsuhiko Ueda, Kanagawa (JP); Yasuo Kusagaya, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/644,830

(22) Filed: Dec. 22, 2009

(65) Prior Publication Data
US 2010/0167650 A1 Jul. 1, 2010

(30) Foreign Application Priority Data
Dec. 25, 2008 (JP) ................................. 2008-331213

(51) Int. Cl.
*H04M 1/00* (2006.01)
(52) U.S. Cl. ................... 455/552.1; 455/41.1; 455/41.2; 455/418; 455/553.1; 455/74; 455/74.1; 455/11.1
(58) Field of Classification Search ........ 455/41.1–41.3, 455/410–411, 11.1, 445, 418, 420, 500, 502, 455/74.1, 507, 510–514, 517, 519, 550.1, 455/552.1, 553.1
See application file for complete search history.

(56) References Cited

U.S. PATENT DOCUMENTS

| | | | |
|---|---|---|---|
| 7,257,398 B1 * | 8/2007 | Ukita et al. | 455/420 |
| 7,565,108 B2 * | 7/2009 | Kotola et al. | 455/41.2 |
| 7,590,409 B2 * | 9/2009 | Morita | 455/411 |
| 7,750,810 B2 * | 7/2010 | Ritter et al. | 340/572.1 |
| 7,801,486 B2 * | 9/2010 | Barnier | 455/41.2 |
| 7,819,307 B2 * | 10/2010 | Lyons et al. | 235/379 |
| 7,965,981 B2 * | 6/2011 | Bloebaum et al. | 455/41.1 |
| 7,970,350 B2 * | 6/2011 | Sheynman et al. | 455/41.1 |
| 7,986,917 B2 * | 7/2011 | Ahlgren et al. | 455/41.2 |
| 8,068,784 B2 * | 11/2011 | Takayama et al. | 455/41.2 |
| 2004/0259499 A1 | 12/2004 | Oba et al. | |

FOREIGN PATENT DOCUMENTS
JP 3671881 4/2005
* cited by examiner

*Primary Examiner* — Tuan A Tran
(74) *Attorney, Agent, or Firm* — K&L Gates LLP

(57) ABSTRACT

Provided is an information processing apparatus including a first and second communication units: the first for non-contact communication with a first/second external apparatus through a first path; and the second for communication with the first/second external apparatus through a second path. The apparatus also includes a unit for controlling the second communication unit to start communication with the second external apparatus through the second path, by a request for such communication transmitted from the second external apparatus to the first communication unit. The apparatus also includes a unit for managing information to be held when the request is received. The information indicates a state of communication with the first external apparatus through the second path at the reception of the request. Under the control, communication with the first communication unit specified by the information starts through the second path, where communication with the second external apparatus has been terminated.

9 Claims, 11 Drawing Sheets

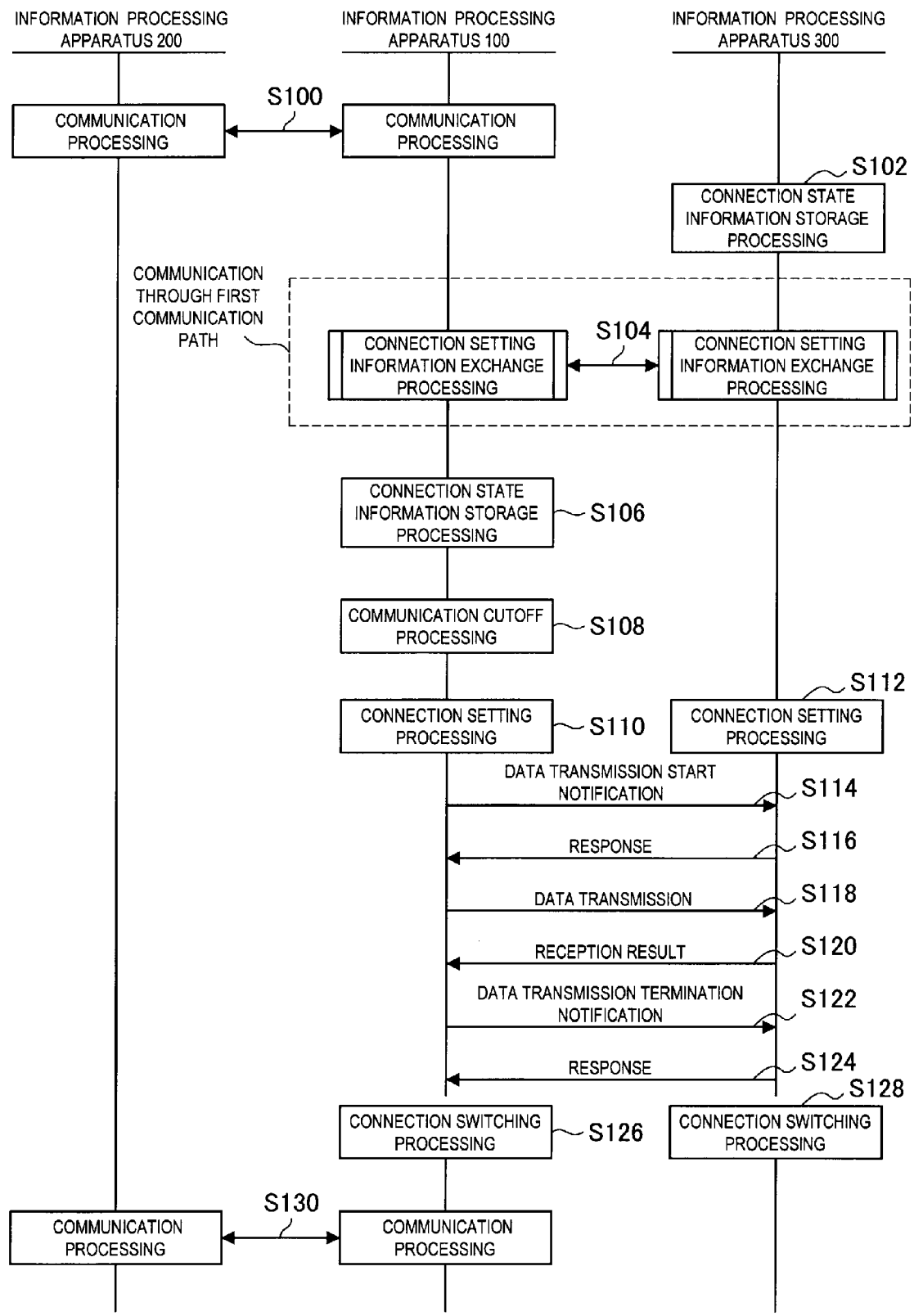

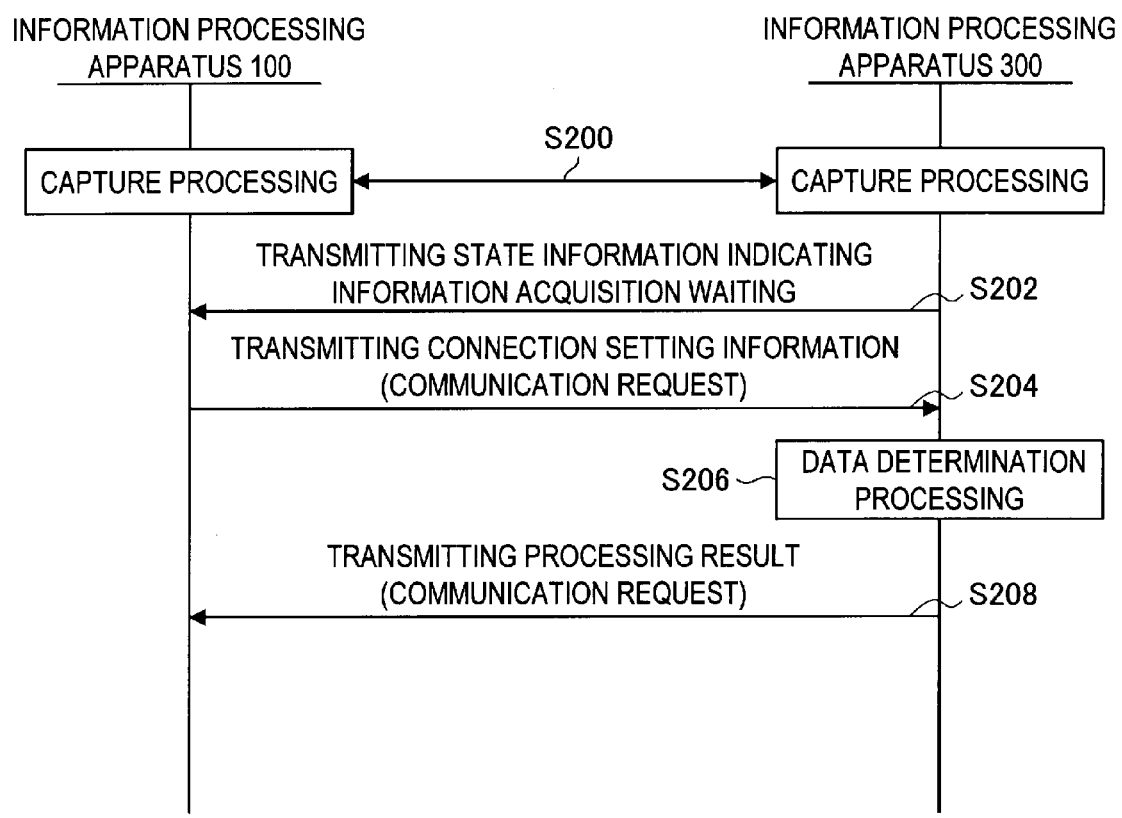

INFORMATION PROCESSING APPARATUS, COMMUNICATION CONTROL METHOD, STORAGE MEDIUM WITH PROGRAM STORED THEREIN, AND INFORMATION PROCESSING SYSTEM

CROSS REFERENCES TO RELATED APPLICATIONS

The present application claims priority to Japanese Priority Patent Application JP 2008-331213 filed in the Japan Patent Office on Dec. 25, 2008, the entire content of which is hereby incorporated by reference.

BACKGROUND

The present application relates to an information processing apparatus, a communication control method, a storage medium with a program stored therein, and an information processing system.

Recently, an information processing apparatus such as a personal computer (PC) and a cell phone has realized a larger number of functions. In some of the information processing apparatuses, the information processing apparatuses having a plurality of different communication functions have appeared.

In the above circumstances, there have been developed techniques related to communication using a plurality of different communication functions. For example, Japanese Patent No. 3671881 describes a technique for specifying the communication partner by selectively switching a plurality of different communication schemes with each other.

SUMMARY

The related art information processing apparatus using the related art associated with communication using a plurality of different communication functions (hereinafter merely referred to as "related art") realizes simplification of communication with an external apparatus, in which setting should be performed for communication, by switching two different communication methods. More specifically, the related art information processing apparatus communicates with an external apparatus by one communication method, in which setting should be performed between the apparatuses for the purpose of establishing communication, and therefore, first, the related art information processing apparatus communicates with the external apparatus by other communication method for performing communication using a magnetic field (a carrier) with a predetermined frequency. Then, the related art information processing apparatus obtains connection setting information from the external apparatus by the other communication method, the connection setting information being necessary for establishment of communication performed by the one communication method. Based on the connection setting information, the related art information processing apparatus performs processing for establishing communication related to the one communication method. By virtue of the processing for establishing communication, communication using the one communication method is started between the related art information processing apparatus and the external apparatus. By virtue of the use of the related art, a user of the related art information processing apparatus does not have to perform setting operation related to the one communication method, and therefore, there is a possibility that the convenience of users can be enhanced.

The related art merely switches a plurality of communication methods, whereby it only attempts to simplify the setting in the one communication method, in which setting should be performed between apparatuses for the purpose of establishing communication. Therefore, in the related art information processing apparatus using the related art, when communication with external apparatus, performed by the one communication method in which communication is established, is complete, the communication performed by the one communication method itself is terminated.

Thus, when the related art is used in the related art information processing apparatus, if the related art information processing apparatus has already communicated with other external apparatus by the one communication method, the related art information processing apparatus performs the following operation, for example. Hereinafter, the other external apparatus is referred to as an "external apparatus 1" as a matter of convenience, and an external apparatus after switching communication, which communicates with the related art information processing apparatus by virtue of the use of the related art, is referred to as an "external apparatus 2" as a matter of convenience. The operation is as follows:

the related art information processing apparatus communicates with the external apparatus 1 by the one communication method;

the related art is used, whereby the related art information processing apparatus stops the communication with the external apparatus 1 by the one communication method to start communication with the external apparatus 2 by the one communication method (switching of communication);

the communication performed by the one communication method between the related art information processing apparatus and the external apparatus 2 is terminated; and the related art information processing apparatus terminates the communication performed by the one communication method.

As described above, in the related art, when the related art information processing apparatus uses the related art, if the related art information processing apparatus communicates with external apparatus 1 by the one communication scheme, the communication is abandoned between the related art information processing apparatus and external apparatus 1, and then the communication partner of the information processing apparatus is switched from external apparatus 1 to external apparatus 2. However, in the related art, it has not been considered that the communication partner of the information processing apparatus may be changed back into external apparatus 1, the former partner, which has been in communication with the information processing apparatus before communication partner switching.

Thus, by use of the related art for communication using a plurality of different communication functions, in the case where the information processing apparatus has switched its communication partner, it will not be possible to change the communication partner back into the former partner, which has been in communication with the information processing apparatus before communication partner switching.

In order to restart the communication between the related art information processing apparatus and external apparatus 1, a user of the related art information processing apparatus and/or a user of external apparatus 1 may necessarily perform operation for restarting the communication. Thus, the convenience of a user will not certainly be enhanced by use of the related art.

In light of the foregoing, it is desirable to provide an information processing apparatus, a communication control method, a storage medium with a program stored therein, and an information processing system, which are novel and improved, and which may enhance the convenience of a user in the case where a communication partner of the user has been changed to another communication end, by switching the other communication end with the former communication partner.

According to an embodiment, there is provided an information processing apparatus including a first communication unit for performing non-contact communication with a first or second external apparatus through a first communication path, and also including a second communication unit for performing communication with the first or second external apparatus through a second communication path different from the first communication path. The information processing apparatus also includes a communication control unit for controlling, based on a communication request for starting communication through the second communication path, the second communication unit to start communication with the second external apparatus through the second communication path. The communication request is transmitted by the second external apparatus and received by the first communication unit. The information processing apparatus also includes a connection state management unit for managing connection state information to be held in response to reception of the communication request by the first communication unit. The connection state information indicates a state of communication with the first external apparatus through the second communication path at the reception of the communication request. The communication control unit controls the second communication unit to start, through the second communication path, communication with the first external apparatus specified by the connection state information when communication with the second external apparatus through the second communication path is terminated.

According to such a configuration, the convenience of a user can be enhanced in the case where a communication partner of the user has been changed to another communication end, by switching the other communication end with the former communication partner.

And also, the communication control unit may switch communication through the second communication path from communication with the first external apparatus to communication with the second external apparatus if the second communication unit is in communication with the first external apparatus through the second communication path when the first communication unit receives the communication request from the second external apparatus.

And also, the communication control unit may switch communication through the second communication path from communication with the second external apparatus to communication with the first external apparatus, based on the connection state information, when communication with the second external apparatus through the second communication path is terminated.

And also, the connection state management unit may manage the connection state information to be held if the second communication unit is in communication with the first external apparatus through the second communication path when the first communication unit receives the communication request.

And also, the information processing apparatus may further include an operating unit operable on settings whether to transmit data to the second external apparatus or receive data from the second external apparatus.

And also, the connection state management unit may manage the connection state information to be held, based on the settings operated by the operating unit.

According to another embodiment, there is provided a communication control method including the step of determining whether a communication request for starting communication through a second communication path different from a first communication path. The communication request is transmitted from a second external apparatus through the first communication path. The communication control method also includes the further steps of holding connection state information indicating a state of communication with a first external apparatus through the second communication path at the reception of the communication request if the communication request is determined to have been received in the step of determining, starting communication with the second external apparatus through the second communication path if the communication request is determined to have been received in the step of determining, and starting, through the second communication path, communication with the first external apparatus specified by the connection state information held in the step of holding when communication with the second external apparatus through the second communication path is terminated.

By use of such a method, the convenience of a user can be enhanced in the case where a communication partner of the user has been changed to another communication end, by switching the other communication end with the former communication partner.

According to yet another embodiment, there is provided a storage medium with a program stored therein, and the program is configured to cause a computer to execute the step of determining whether a communication request for starting communication through a second communication path different from a first communication path. The communication request is transmitted from a second external apparatus through the first communication path. The program is also configured to cause a computer to execute the further steps of holding connection state information indicating a state of communication with a first external apparatus through the second communication path at the reception of the communication request if the communication request is determined to have been received in the step of determining, starting communication with the second external apparatus through the second communication path if the communication request is determined to have been received in the step of determining, and starting, through the second communication path, communication with the first external apparatus specified by the connection state information held in the step of holding when communication with the second external apparatus through the second communication path is terminated.

By use of a storage medium with such a program stored therein, the convenience of a user can be enhanced in the case where a communication partner of the user has been changed to another communication end, by switching the other communication end with the former communication partner.

According to yet another embodiment, there is provided an information processing system including a plurality of information processing apparatuses operable to perform non-contact communication through a first communication path. Each of the plurality of information processing apparatuses includes a first communication unit for performing non-contact communication with a first or second external apparatus through a first communication path, and also includes a second communication unit for performing communication with the first or second external apparatus through a second communication path different from the first communication path. Each of the plurality of information processing apparatuses also includes a communication control unit for controlling the second communication unit to start communication with the second external apparatus through the second communication path, based on a communication request for starting communication through the second communication path. The communication request is transmitted by the second external apparatus and received by the first communication unit. Each of the plurality of information processing apparatuses also includes a connection state management unit for managing connection state information to be held in response to reception of the communication request by the first communication unit, the connection state information indicating a state of communication with the first external apparatus through the second communication path at the reception of the communication request. The communication control unit controls the second communication unit to start, through the second communication path, communication with the first external apparatus specified by the connection state information when communication with the second external apparatus through the second communication path is terminated.

According to such a configuration, an information processing system can be realized for enhancing the convenience of a user in the case where a communication partner of the user has been changed to another communication end, by switching the other communication end with the former communication partner.

According to embodiments described above, the convenience of a user can be enhanced in the case where a communication partner of the user has been changed to another communication end, by switching the other communication end with the former communication partner.

Additional features and advantages are described herein, and will be apparent from the following Detailed Description and the figures.

BRIEF DESCRIPTION OF THE FIGURES

FIG. 5 is an explanatory view showing an example of a processing for realizing the convenience enhancement approach in an information processing system according to the embodiments;

FIG. 6 is an explanatory view showing an example of communication through a first communication path according to the embodiments;

DETAILED DESCRIPTION

Figure 1A:
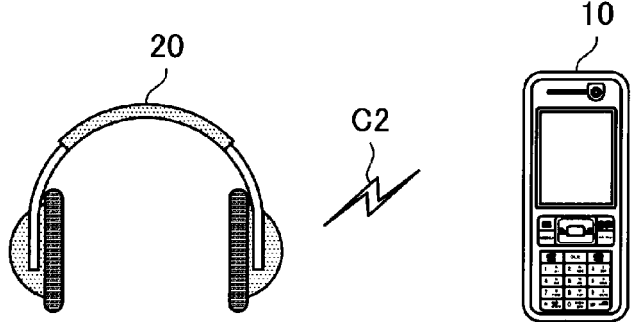
FIGS. 1A-D are explanatory view for explaining an example of a possible issue occurring in the related art.

The present application will be described in detail with reference to the appended drawings according to an embodiment. Note that, in this specification and the appended drawings, structural elements that have substantially the same function and structure are denoted with the same reference numerals, and repeated explanation of these structural elements is omitted.

The descriptions will be presented hereinafter in the order of:

1. a convenience enhancement approach according to embodiments;
2. an information processing apparatus according to the embodiments; and
3. a program according to the embodiments.

The convenience enhancement approach according to an embodiment

Before description of a constitution of an information processing apparatus according to embodiments, the convenience enhancement approach according to the embodiments is described. An information processing system having one or two or more information processing apparatuses according to the embodiments is hereinafter referred to as an information processing system according to the embodiments (hereinafter also may be referred to as an "information processing system 1000").

In the following description, the information processing apparatus according to the embodiments has two communication functions, one of which performs communication through a first communication path and the other performing communication through a second communication path. Needless to say, the communication function of the information processing apparatus according to the embodiments is not limited to those two communication functions of performing communication through the first and second communication paths.

The first communication path according to the embodiments is, for example, a communication path formed by a communication method that can realize the one-to-one communication with an external apparatus without a specific connection setting performed by a user. The first communication path according to the embodiments includes a communication path formed by Near Field Communication (NFC), in which a magnetic field (carrier) with a specified frequency such as 13.56 MHz is used in communication, and a communication path formed by infrared communication using an infrared ray in communication; however, the first communication path is not limited to those. In the following description, the communication through the first communication path according to the embodiments uses the carrier with a specified frequency such as 13.56 MHz.

The second communication path according to the embodiments is, for example, a communication path formed by a communication method in which although a predetermined connection setting should be performed for the one-to-one communication with an external apparatus, higher speed communication than the communication using the first communication path can be realized. The communication through the second communication path according to the embodiments includes wireless communication using IEEE802.15.1, wireless communication using a wireless LAN such as IEEE802.11b, and wire communication using a LAN; however, it is not limited to those.

[Possible Issue Occurring in the Related Art]

In order to further clarify the convenience enhancement approach according to the embodiments, a possible issue occurring in the related art is described again. FIG. 1 is an explanatory view for explaining an example of a possible issue occurring in the related art. FIGS. 1A to 1D represent the relationship of communication between the related art information processing apparatuses 10, 20, and 30 in chronological order from FIGS. 1A to 1D. In the examples of FIGS. 1A to 1D, the information processing apparatuses 10 and 30 are cell phones, and the information processing apparatus 20 is a headphone.

In the example of FIG. 1, the communication between the respective information processing apparatuses is performed through a first communication path C1 according to the embodiments or a second communication path C2 according to the embodiments.

[a] First Time Point (FIG. 1A)

The information processing apparatus 10 communicates with the information processing apparatus 20 through the second communication path C2. Thus, a user can hear a sound, represented by audio data reproduced by the information processing apparatus 10, by using the information processing apparatus 20.

Figure 1B:
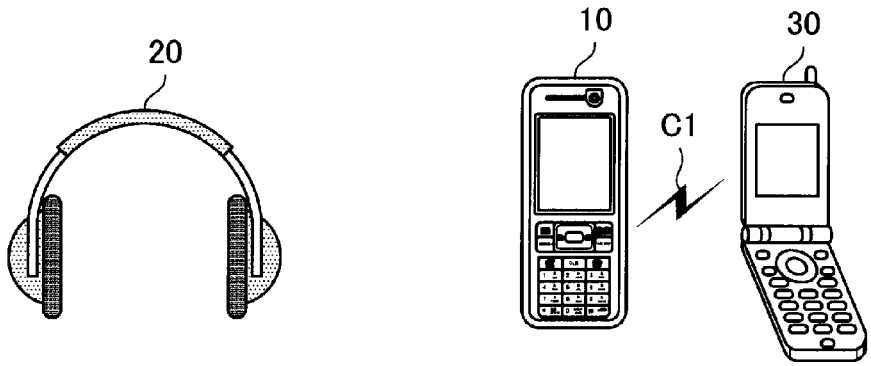

[b] Second Time Point (FIG. 1B)

The communication through the first communication path C1 is performed between the information processing apparatuses 10 and 30. When the information processing apparatus 30 transmits a communication request requesting communication through the second communication path C2, the information processing apparatus 10 stops the communication with the information processing apparatus 20. Accordingly, the sound based on the audio data is not output from the information processing apparatus 20. In the communication between the information processing apparatuses 10 and 30 through the first communication path C1, the information processing apparatus 10 receives connection setting information for performing communication through the second communication path C2 from the information processing apparatus 30 or transmits the connection setting information to the information processing apparatus 30.

Figure 1C:
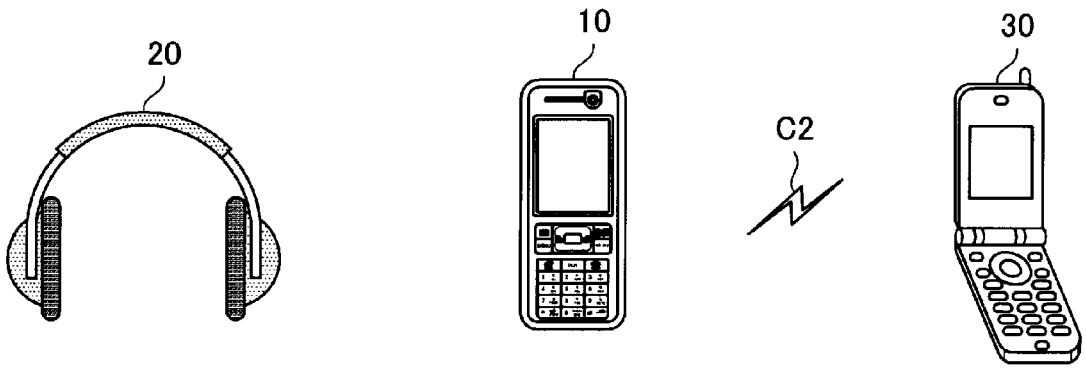

[c] Third Time Point (FIG. 1C)

The information processing apparatus 10 establishes the communication with the information processing apparatus 30 through the second communication path C2 based on the connection setting information transmitted/received at [b] and starts the communication with the information processing apparatus 30.

Figure 1D:
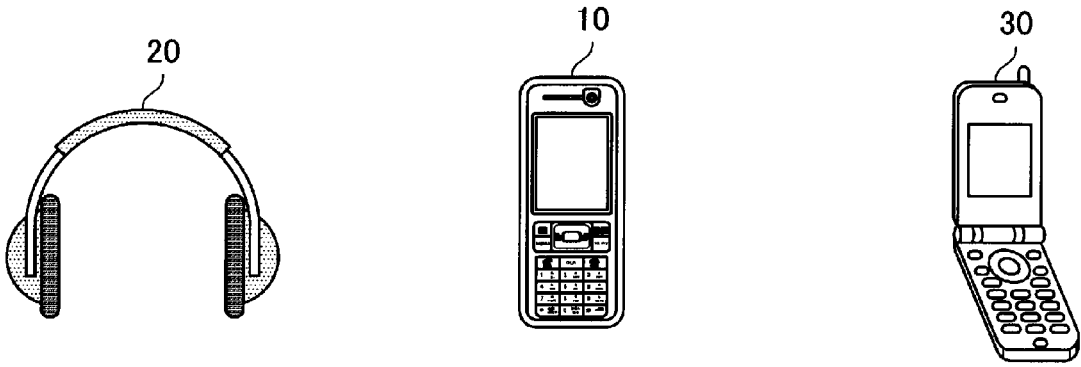

[d] Fourth Time Point (FIG. 1D)

When the communication between the information processing apparatuses 10 and 30 through the second communication path C2 started at [c] is terminated, the information processing apparatus 10 terminates the communication with an external apparatus through the second communication path C2.

As shown in FIGS. 1A to 1D, the information processing apparatus 10 can switch its communication partner on the second communication path C2 from the information processing apparatus 20 to the information processing apparatus 30, but fails to change its communication partner back into the information processing apparatus 20 having communicated with the information processing apparatus 10 before the switching. Accordingly, the sound represented by the audio data reproduced by the information processing apparatus 10 is not output from the information processing apparatus 20 after the second time point shown in FIG. 1B. In order to cause the information processing apparatus 20 to again output the sound represented by the audio data reproduced by the information processing apparatus 10, the user should again perform a setting operation related to a setting for causing the information processing apparatuses 10 and 20 to communicate with each other through the second communication path C2. Therefore, when the related art is used, the convenience of users may be lost, and thus it is hopeless to enhance the convenience of users.

[The Outline of the Convenience Enhancement Approach According to the Embodiments]

Figure 2A:
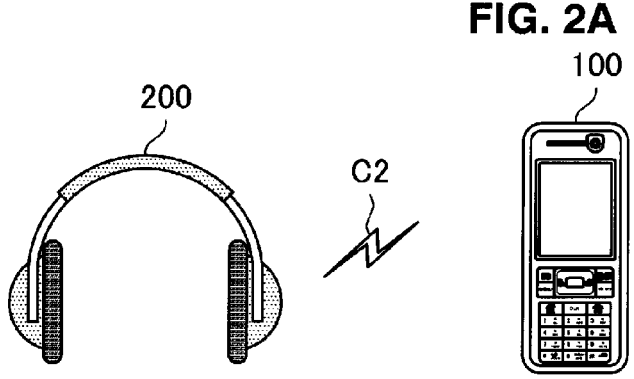
FIGS. 2A-D are explanatory view for explaining an outline of a convenience enhancement approach according to embodiments.

Next, the outline of the convenience enhancement approach according to the embodiments is shown. FIG. 2 is an explanatory view for explaining the outline of the convenience enhancement approach according to the embodiments. As with FIGS. 1A to 1D, FIGS. 2A to 2D represent the relationship of communication between information processing apparatuses 100, 200, and 300 in chronological order from FIGS. 2A to 2D. FIG. 2A corresponds to the time point of FIG. 1A, and FIG. 2B corresponds to the time point of FIG. 1B. Likewise, FIGS. 2C and 2D respectively correspond to the time points of FIGS. 1C and 1D.

In contrast with FIGS. 1A to 1D, in FIGS. 2A to 2D, the information processing apparatuses 100 and 300 are cell phones, and the information processing apparatus 200 is a headphone. Needless to say, the information processing apparatus according to the embodiments is not limited to the cell phones and the headphone of FIGS. 2A to 2D.

[A] First Time Point (FIG. 2A)

The information processing apparatus 100 communicates with the information processing apparatus 200 through a second communication path C2. Thus, for example, a user can hear a sound represented by audio data reproduced by the information processing apparatus 100 by using the information processing apparatus 200.

Figure 2B:
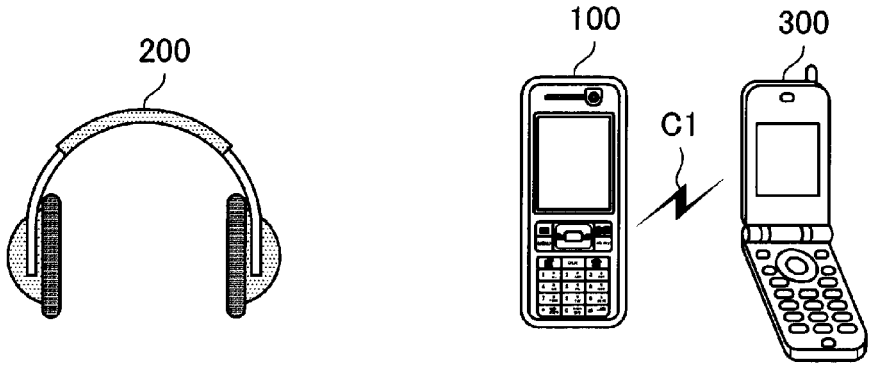

[B] Second Time Point (FIG. 2B)

The information processing apparatuses 100 and 300 communicate with each other through a first communication path C1. For example, either one of the information processing apparatuses 100 and 300 serves for transmitting the carrier to the other information processing apparatus, whereby the information processing apparatuses 100 and 300 communicate with each other through the first communication path C1. The information processing apparatus transmitting the carrier is operated as a so-called reader/writer.

<A Communication Example in the First Communication Path C1>

The communication through the first communication path C1 is more specifically described in the case where the information processing apparatus 300 transmits the carrier. When the information processing apparatus 300 transmits the carrier carrying a carrier signal, the information processing apparatus 100 having received the carrier from an antenna processes the received carrier signal and returns a response signal for the received carrier signal by load modulation based on the processing result. For example, the information processing apparatus 300 detects the amplitude change of the voltage at the end of the antenna occurring due to the load modulation to thereby demodulate the response signal. The processing is performed in the information processing apparatuses 100 and 300, whereby the information processing apparatuses 100 and 300 can communicate with each other through the first communication path C1.

When the information processing apparatus 100 obtains a communication request transmitted from the information processing apparatus 300 and requesting the communication through the second communication path C2, the information processing apparatus 100 stores connection state information showing a state of communication with an external apparatus through the second communication path C2 and stops the communication with the information processing apparatus 200. Accordingly, the output of the sound based on the audio data in the information processing apparatus 200 is interrupted.

The communication request according to the embodiments includes the connection setting information used for establishing the communication through the second communication path C2 and information (data) showing that the information processing apparatus is in a state capable of communicating through the second communication path C2. Specific examples of the communication request according to embodiments in the information processing system 1000 according to the embodiments are described later with reference to FIGS. 6 to 9.

The connection state information according to the embodiments is information (data) showing a state of communication with the external apparatus through the second communication path at the time when the communication request is received. Although the connection state information includes the connection setting information recorded with information of the connection setting for performing communication through the second communication path C2, it is not limited to this. For example, the connection state information may further include information about communication contents. The connection setting information according to the embodiments can include Personal Identification Number (PIN) for authentication and information such as a private IP address set in an external apparatus and a unique media access control address (MAC address) to an external apparatus; however, it is not limited to those. For example, the connection setting information according to the embodiments can include information such as a private IP address set in the own apparatus and a unique MAC address to the own apparatus. Although the information about the communication contents includes a file name of data under transmission or reception and an address whose transmission or reception is interrupted, it is not limited to those.

Before the communication with the information processing apparatus 200 is abandoned, the information processing apparatus 100 stores the connection setting information including the above information, which is related to the communication with the information processing apparatus 200 through the second communication path. Thus, the information processing apparatus 100 uses the stored connection state information, whereby after the information processing apparatus 100 stops the communication with the information processing apparatus 200 through the second communication path, the information processing apparatus 100 can communicate again with the information processing apparatus 200 through the second communication path (FIG. 2D to be described later).

In the communication between the information processing apparatuses 100 and 300 through the first communication path C1, the information processing apparatus 100 receives the connection setting information for performing communication through the second communication path C2 from the information processing apparatus 300 or transmits the connection setting information to the information processing apparatus 300.

Figure 2C:
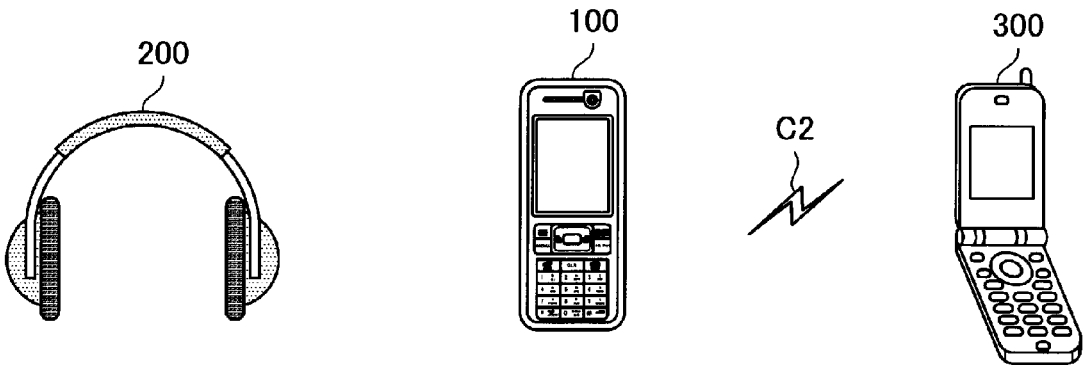
Figure 2D:
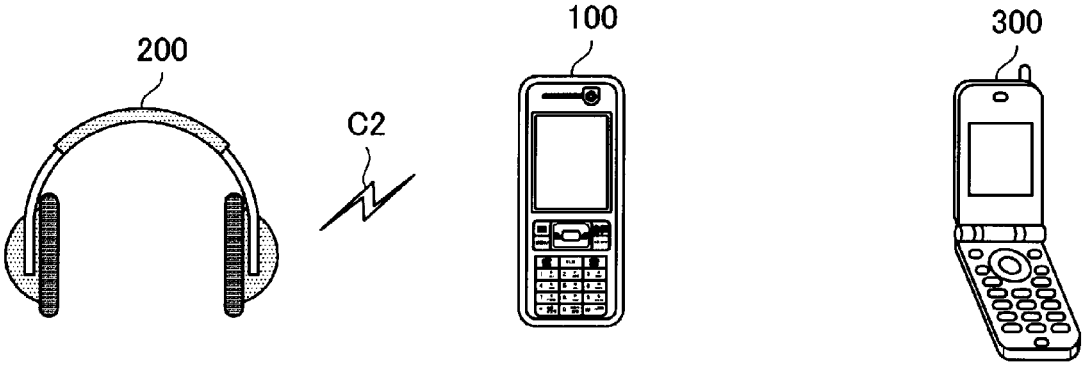

[C] Third Time Point (FIG. 2C)

The information processing apparatus 100 establishes the communication with the information processing apparatus 300 through the second communication path C2 by the connection setting information transmitted/received at [B] and starts the communication with the information processing apparatus 300. In the communication between the information processing apparatuses 100 and 300 through the second communication path C2, although various data including image data and audio data is transmitted and received, is it not limited to this.

[D] Fourth Time Point (FIG. 2D)

When the communication between the information processing apparatuses 100 and 300 through the second communication path C2 having started at [C] is terminated, the information processing apparatus 100 determines whether or not the connection state information is stored. In the example of FIG. 2, the connection setting information about the information processing apparatus 200 is stored at [B], and therefore, the information processing apparatus 100 switches its communication partner on the second communication path C2 from the information processing apparatus 300 to the information processing apparatus 200, based on the connection state information. Thus, since the information processing apparatuses 100 and 200 again communicate with each other through the second communication path C2, the user can hear the sound, which is represented by the audio data reproduced by the information processing apparatus 100, by using the information processing apparatus 200.

As described above, when the information processing apparatus 100 switches its communication partner to communicate with through the second communication path, it stores the connection state information about communication with the external apparatus, its former partner, which has been in communication with it before communication partner switching. When the communication through the second communication path between the information processing apparatus 100 and the external apparatus, which communicates with the information processing apparatus 100 after communication partner switching, is terminated, based on the stored connection state information, the information processing apparatus 100 switches the communication through the second communication path to the communication with the external apparatus which has communicated with the information processing apparatus 100 before communication partner switching. Accordingly, in the communication between the 100 and 200 after communication partner switching, the user of the information processing apparatus 100 does not have to perform the setting operation for performing communication through the second communication path unlike the case of using the related art information processing apparatus.

Thus, in the case where the information processing apparatus 100 switches its communication partner, the information processing apparatus 100 may change its communication partner back into the external apparatus, its former partner, which has been in communication with it before communication partner switching. And then, such switching processing may enhance the convenience of a user.

Although not shown in FIG. 2, the information processing apparatus 300, as with the information processing apparatus 100, can communicate with other external apparatus through the second communication path after termination of communication with the information processing apparatus 100 through the second communication path C2, based on the stored connection state information. Namely, in the information processing system 1000 according to the embodiments, the respective information processing apparatuses constituting the information processing system 1000 can perform a processing similar to that performed by the information processing apparatus 100 shown in FIG. 2.

[Another Convenience Enhancement Approach According to Embodiments]

Next, there is described another convenience enhancement approach according to the embodiments for realizing further enhancement of the convenience of users. As shown in FIG. 2, in the information processing system 1000, in the communication between the respective information processing apparatuses through the first and second communication paths C1 and C2, data is transmitted and received, for example. In the information processing system 1000, as shown in FIGS. 2B and 2C, the communication through the second communication path C2 can seamlessly start after the communication through the first communication path C1. Thus, the user of each information processing apparatus may be hard to grasp the condition related to the data transmission/reception, such as whether the user's information processing apparatus is on the data transmission side or on the data reception side and whether or not the information processing apparatus is under communication.

Thus, in an embodiment, in order to further enhance the convenience of users, for example, information about a state of data transmission/reception is transmitted as visual information to a user, whereby the convenience of users can be further enhanced. In the following example, the information processing apparatus 100 transmits, as visual information, the information about the state of data transmission/reception to a user; however, the information transmission method according to the embodiments is not limited to the following example. For example, the information processing apparatus according to the embodiments can transmit, as auditory information (for example, audio information), the information about the state of data transmission/reception to a user. Further, the information transmission method according to the embodiments is not limited to the information processing apparatus 100, but also can be applied to arbitrary information processing apparatus constituting the information processing system 1000.

Figure 3:
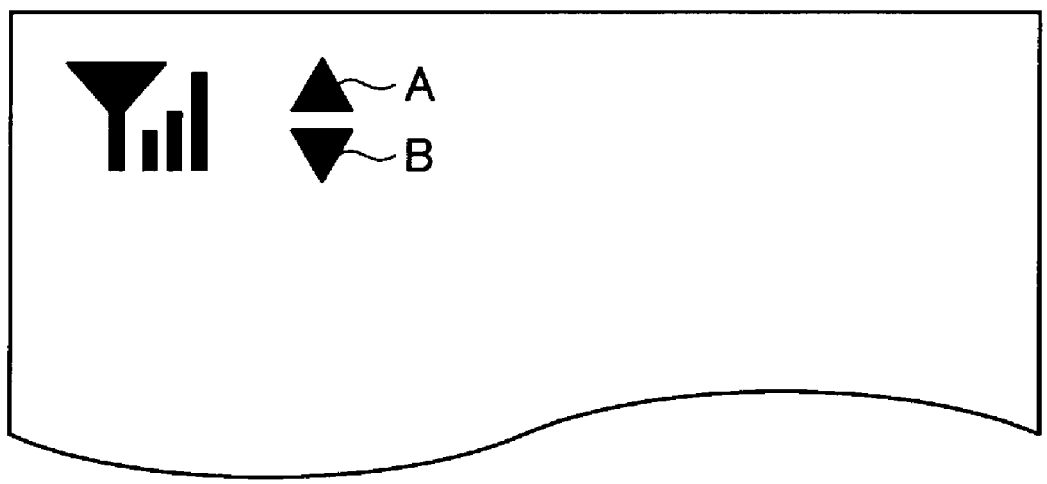
FIG. 3 is an explanatory view for explaining another convenience enhancement approach according to the embodiments.
Figure 4A:
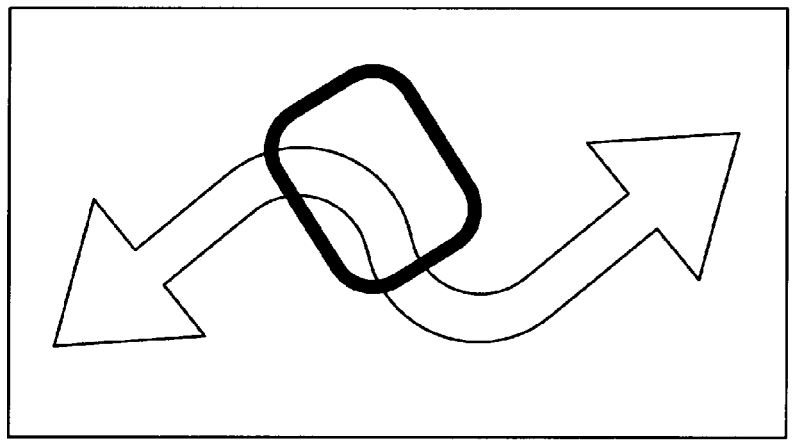
FIGS. 4A-C are explanatory view for explaining another convenience enhancement approach according to the embodiments.
Figure 4B:
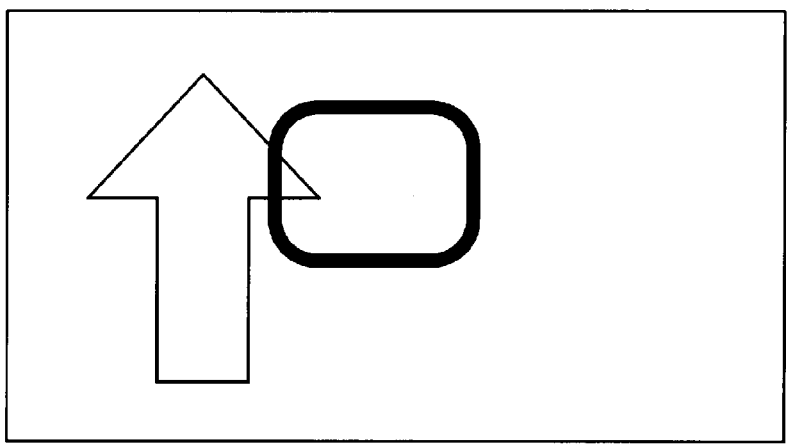
Figure 4C:
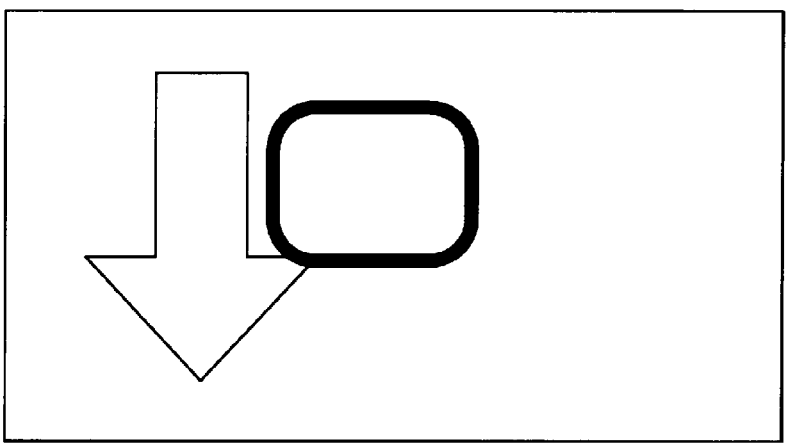

FIGS. 3 and 4 are explanatory views for explaining another convenience enhancement approach according to the embodiments. FIG. 3 shows an example of a display screen displayed on a display unit (to be described later) of the information processing apparatus 100. FIGS. 4A to 4C show examples of icons displayed on the display unit (to be described later) of the information processing apparatus 100 and showing a state related to transmission and reception.

Referring to FIG. 3, icons A and B are displayed on the display screen of the information processing apparatus 100. The icon A shows that, for example, image data showing an image displayed on the display screen can be transmitted to an external apparatus. The icon B shows that the information processing apparatus 100 is in a state capable of receiving data from an external apparatus.

The icon such as the icons A and B of FIG. 3 is displayed on the display screen, whereby the user can recognize the state of the information processing apparatus 100. The information processing apparatus 100 can selectively validate a function working with the icon displayed on the display screen. Since the processing can prevent a user from performing operation related to an unusable function, the information processing apparatus 100 can enhance the convenience of users.

FIG. 4A shows an example of an icon showing that the information processing apparatus 100 is currently communicating with an external apparatus. The icon shown in FIG. 4A is displayed on the display screen, whereby the user can recognize that the information processing apparatus 100 is currently communicating with the external apparatus.

FIG. 4B shows an example of an icon showing that the information processing apparatus 100 transmits data to an external apparatus. In the information processing apparatus 100, for example, the user performs a predetermined operation showing that data transmission is performed, and when a processing related to data transmission is prepared, the icon shown in FIG. 4B is displayed on the display screen. The icon shown in FIG. 4B is displayed on the display screen, whereby the user can recognize the state of the information processing apparatus 100 (in the example of FIG. 4B, whether or not the information processing apparatus 100 is in a state capable of performing the data transmission processing). Thus, for example when the icon shown in FIG. 4B is displayed, the user holds the information processing apparatus 100 over the external apparatus (moves the information processing apparatus 100 so that the distance between the information processing apparatus 100 and the external apparatus is a predetermined distance, as the case may be) and consequently can cause the information processing apparatus 100 to perform the communication through the first communication path. The icon shown in FIG. 4B is displayed on the display screen of the information processing apparatus 100, whereby the user can recognize a timing of holding the information processing apparatus 100 (that is, the timing of causing the information processing apparatus 100 to normally communicate with the external apparatus through the first communication path). Further, the icon shown in FIG. 4B is displayed on the display screen of the information processing apparatus 100, whereby the user can recognize that the information processing apparatus 100 transmits data to the external apparatus.

FIG. 4C shows an example of an icon showing that the information processing apparatus 100 acquires data from the external apparatus. In the information processing apparatus 100, for example, the user performs a predetermined operation showing data acquisition, and when the processing related to data acquisition is prepared, the icon shown in FIG. 4C is displayed on the display screen. The icon shown in FIG. 4C is displayed on the display screen, whereby the user can recognize the state of the information processing apparatus 100 (in the example of FIG. 4C, whether or not the information processing apparatus 100 is in a state capable of performing the processing related to data acquisition). Thus, when the icon shown in FIG. 4C is displayed, the user, for example, holds the information processing apparatus 100 over the external apparatus and consequently can cause the information processing apparatus 100 to perform communication through the first communication path. The icon shown in FIG. 4C is displayed on the display screen of the information processing apparatus 100, whereby the user can recognize the timing of holding the information processing apparatus 100 as in the case where the icon of FIG. 4B is displayed. Further, the icon shown in FIG. 4C is displayed on the display screen, whereby the user can recognize that the information processing apparatus 100 acquires data from the external apparatus.

When the information processing apparatus 100 communicates with the external apparatus, for example, the icons shown in FIGS. 3 and 4 are displayed on the display screen, whereby the information processing apparatus 100 transmits, as the visual information, the information about the state of data transmission/reception to the user. The information about the state of data transmission/reception is transmitted, whereby the user can recognize the state of data transmission/reception, and therefore, the information processing apparatus 100 can enhance the convenience of users.

In the information processing apparatus 100, the another convenience enhancement approach and the convenience enhancement approach according to the embodiments whose outline has been shown with reference to FIG. 2 can be combined with each other. Thus, the information processing apparatus 100 can further enhance the convenience of users. Hereinafter, the convenience enhancement approach according to the embodiments whose outline has been shown with reference to FIG. 2 is mainly described.

[An Example of Processing Related to the Convenience Enhancement Approach According to an Embodiments]

Next, the processing for realizing the convenience enhancement approach according to embodiments is more specifically described.

FIG. 5 is an explanatory view showing an example of the processing for realizing the convenience enhancement approach in the information processing system 1000 according to the embodiments. FIG. 5 shows an example of a processing in the information processing system 1000 having a constitution similar to that of FIG. 2, that is, the information processing system 1000 having the information processing apparatuses 100, 200, and 300. In the following example, a user of the information processing apparatus 300 holds the information processing apparatus 300 over the information processing apparatus 100, whereby the information processing apparatuses 100 and 300 start communication through the first communication path; however the example is not limited to this. For example, a user of the information processing apparatus 100 holds the information processing apparatus 100 over the information processing apparatus 300, whereby the information processing apparatuses 100 and 300 can start communication through the first communication path.

In FIG. 5, with the exception of communication processing of step S104 illustrating the communication through the first communication path, the respective information processing apparatuses communicate through the second communication path. FIG. 5 further shows an example where the convenience enhancement approach according to the embodiments is applied to the information processing apparatuses 100 and 300. Besides, an external apparatus into which the information processing apparatus 300 changes its communication partner is not illustrated in FIG. 5.

The information processing apparatuses 100 and 200 communicate with each other through the second communication path (S100). The information processing apparatus 300 communicates with an external apparatus (not shown) through the second communication path and stores the connection state information about the external apparatus based on a predetermined user's operation related to data transmission/reception (S102: connection state information storage processing). The predetermined user's operation includes a setting operation (predetermined setting operation) performed by the user of the information processing apparatus 300 by means of an operating unit (to be described later), the setting operation being performed for setting either transmission of data to the external apparatus or reception of data from the external apparatus; however, the predetermined user's operation is not limited to this setting operation. The information processing apparatus 300 further can display the icons, shown in FIGS. 4B and 4C, on the display screen based on the setting operation.

When the information processing apparatus 300 is held over the information processing apparatus 100, the information processing apparatuses 100 and 300 each perform connection setting information exchange processing related to the communication through the first communication path (S104). In the connection setting information exchange processing shown in step S104, the connection setting information is transmitted/received between the information processing apparatuses 100 and 300. Hereinafter, an example of the connection setting information exchange processing according to the embodiments is described.

[An Example of the Connection Setting Information Exchange Processing According to an Embodiments]

[1] First Example

FIG. 6 is an explanatory view showing an example of the communication through the first communication path according to the embodiments and shows the first example of the connection setting information exchange processing according to the embodiments. FIG. 6 shows an example in which the information processing apparatus 300 is set in a state of receiving data from the external apparatus by the setting operation performed by the user of the information processing apparatus 300 in step S102. Hereinafter, information showing the state, which is set by the setting operation and related to data transmission/reception, may be referred to as state information.

When the information processing apparatus 300 is held over the information processing apparatus 100, the information processing apparatuses 100 and 300 perform capture processing for detecting their respective communication partners to communicate with each other through the first communication path (S200). In the processing of S200, for example, one information processing apparatus serves as a reader/writer voluntarily transmitting the carrier, and the other one serves to perform load modulation based on the received carrier to thereby perform a response. More specifically, in the processing of S200, for example, one information processing apparatus periodically/non-periodically transmits the wave carrier, and the other information processing apparatus having received the carrier transmits a response signal by performing the load modulation, whereby the one information processing apparatus receives the response signal. When the information processing apparatuses 100 and 300 transmit the carrier, they mutually repeat polling and the load modulation, and their roles are set at the time when it is possible to communicate through the first communication path; however, it is not limited to this case. In FIG. 6, the information processing apparatus 300 serves as the reader/writer.

The information processing apparatus 300 transmits state information indicating information acquisition waiting to the information processing apparatus 100 (S202).

The information processing apparatus 100, which has received the state information transmitted from the information processing apparatus 300 in step S202, transmits the connection setting information to the information processing apparatus 300 (S204). The transmission of the connection setting information of step S204 corresponds to the communication request from the information processing apparatus 100 to the information processing apparatus 300, according to the embodiments. The connection setting information transmitted in step S204 includes PIN, a private IP address set in the information processing apparatus 100, and a unique MAC address to the information processing apparatus 100; however, it is not limited to those.

Although not shown in FIG. 6, the information processing apparatus 100 can further transmit other information (data) in addition to the connection setting information in step S204. Although not shown in FIG. 6, for example when the information processing apparatus 100 is set in a state of receiving data from an external apparatus by user's setting operation, the information processing apparatus 100 can transmit error information showing an error in step S204. In this case, the information processing apparatus 300 having received the error information performs a predetermined error processing such as termination of communication with the information processing apparatus 100; however, the processing is not limited to this.

The information processing apparatus 300 having received the connection setting information transmitted in step S204 determines whether or not the received information (data) can be processed (S206: data determination processing).

The information processing apparatus 300 then transmits the processing result in step S206 to the information processing apparatus 100 (S208). When it is determined that the received connection setting information can be processed in step S206, the processing result transmitted in step S208 corresponds to the communication request from the information processing apparatus 300 to the information processing apparatus 100, according to embodiments.

When it is determined that the received connection setting information may not be processed in the processing of step S206, the information processing apparatus 300 transmits as the processing result the error information showing an error, for example. In this case, the information processing apparatus 100 having received the error information performs a predetermined error processing such as termination of communication with the information processing apparatus 300; however, the processing is not limited to this.

In the information processing apparatuses 100 and 300, the connection setting information is transmitted and received by the processing shown in FIG. 6.

[2] Second Example

Figure 7:
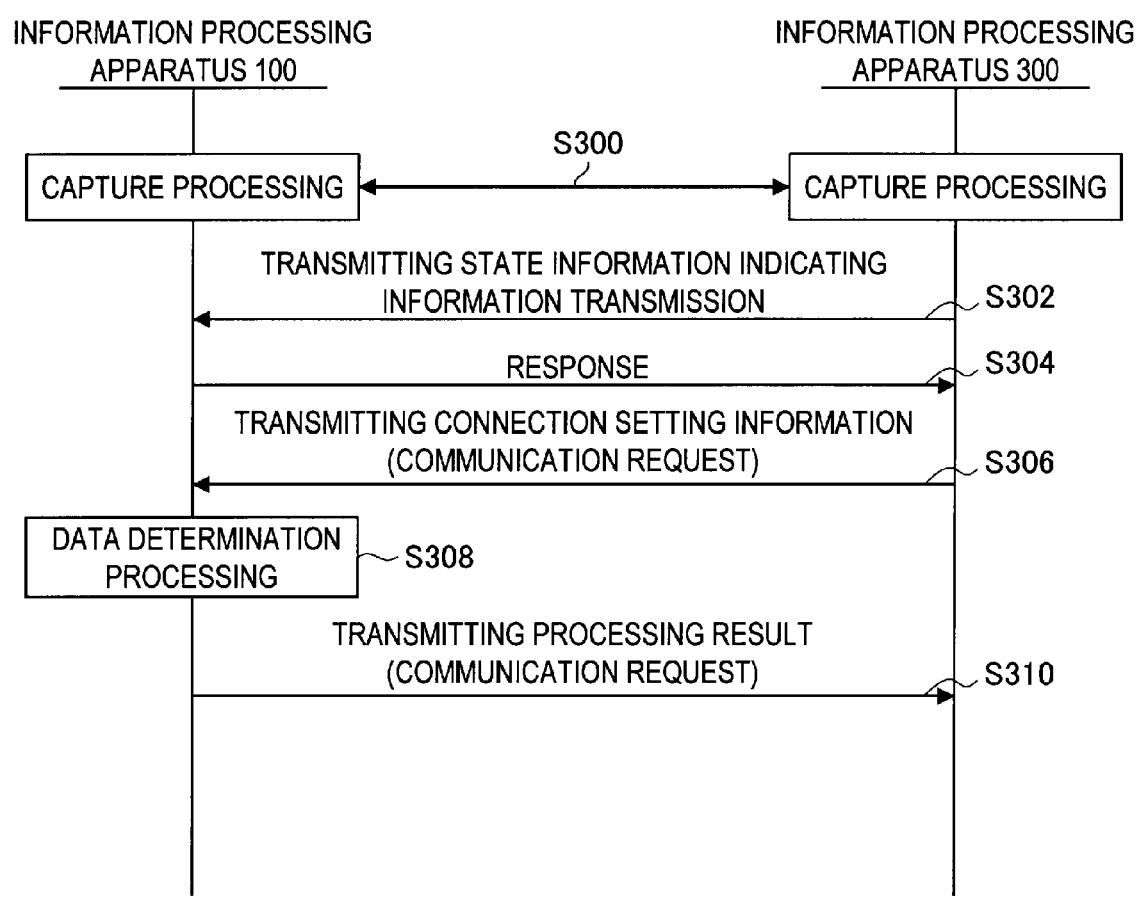
FIG. 7 is an explanatory view showing an example of communication through a first communication path according to the embodiments.

FIG. 7 is an explanatory view showing an example of the communication through the first communication path according to the embodiments and shows the second example of the connection setting information exchange processing according to embodiments. FIG. 7 shows an example in which the information processing apparatus 300 is set in a state of transmitting data to the external apparatus by the setting operation performed by the user of the information processing apparatus 300 in step S102.

When the information processing apparatus 300 is held over the information processing apparatus 100, the information processing apparatuses 100 and 300 perform the capture processing as with step S200 of FIG. 6 (S300). In FIG. 7, the information processing apparatus 300 serves as a reader/writer.

The information processing apparatus 300 transmits the state information indicating information transmission to the information processing apparatus 100 (S302).

The information processing apparatus 100 having received the state information transmitted from the information processing apparatus 300 in step S302 performs a response, showing that the state information has been normally received, to the information processing apparatus 300 (S304). Although not shown in FIG. 7, for example when the information processing apparatus 100 is set in a state of transmitting data to an external apparatus by user's setting operation, the information processing apparatus 100 can transmit as the response the error information showing an error in step S304. In this case, the information processing apparatus 300 having received the error information performs a predetermined error processing such as termination of communication with the information processing apparatus 100; however, the processing is not limited to this.

The information processing apparatus 300 having received the response transmitted from the information processing apparatus 100 in step S304 transmits the connection setting information to the information processing apparatus 100 as with step S204 of FIG. 6 (S306). The transmission of the connection setting information of step S306 corresponds to the communication request from the information processing apparatus 300 to the information processing apparatus 100, according to an embodiments.

The information processing apparatus 100 having received the connection setting information transmitted in step S306 determines whether or not the received information (data) can be processed as with step S206 of FIG. 6 (S308: data determination processing). The information processing apparatus 100 then transmits the processing result in step S308 to the information processing apparatus 300 as with step S208 of FIG. 6 (S310). When it is determined that the received connection setting information can be processed in the processing of step S308, the processing result transmitted in step S310 corresponds to the communication request from the information processing apparatus 100 to the information processing apparatus 300, according to the embodiments.

In the information processing apparatuses 100 and 300, the connection setting information is transmitted and received by the processing shown in FIG. 7.

The first example shown in FIG. 6 and the second example shown in FIG. 7 show the connection setting information exchange processing in the case where either the transmission of data to the external apparatus or the reception of data from the external apparatus is set by the user's setting operation in the information processing apparatus 300. However, the connection setting information exchange processing in the information processing system 1000 according to embodiments is not limited to the above case.

[3] Third Example

Figure 8:
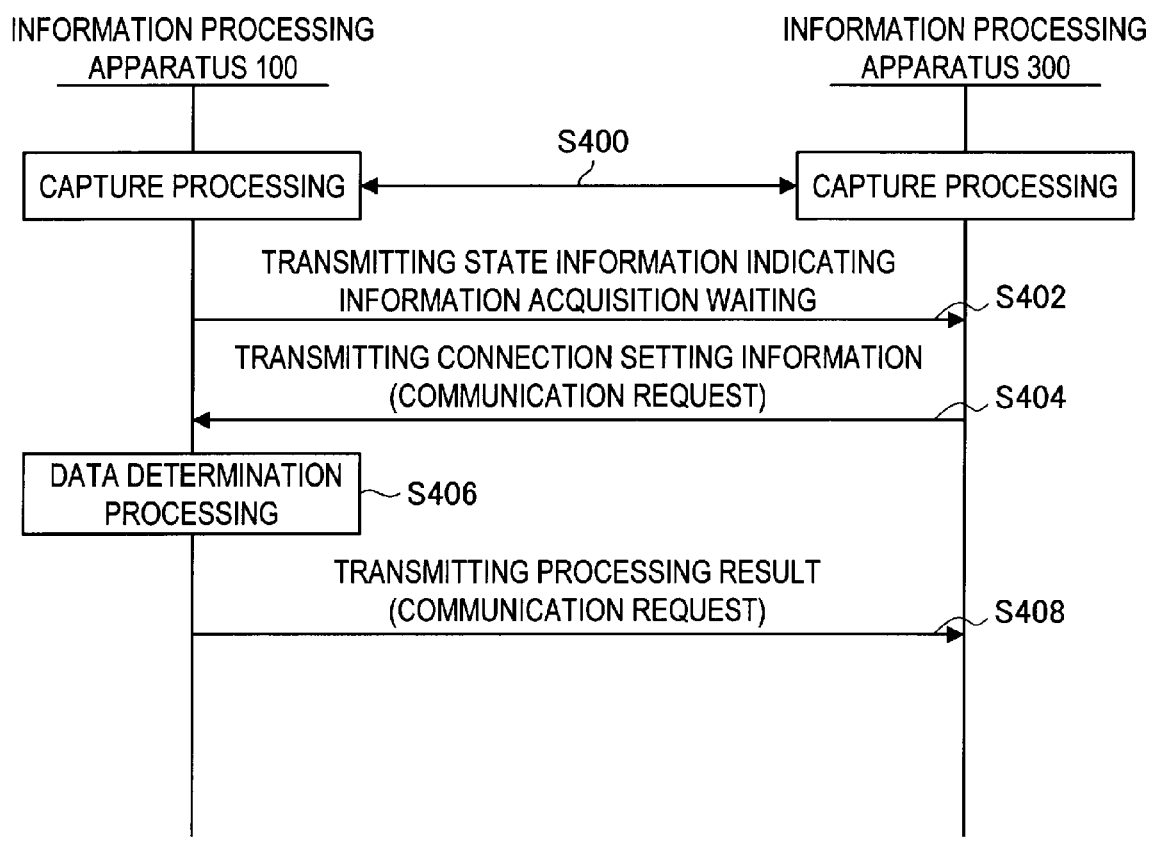
FIG. 8 is an explanatory view showing an example of communication through a first communication path according to the embodiments.

FIG. 8 is an explanatory view showing an example of the communication through the first communication path according to the embodiments and shows the third example of the connection setting information exchange processing according to the embodiments. FIG. 8 shows an example in which the information processing apparatus 100 is set in a state of receiving data from an external apparatus by the setting operation performed by the user of the information processing apparatus 100, and the information processing apparatus 100 serves as a reader/writer.

When the information processing apparatus 300 is held over the information processing apparatus 100, the information processing apparatuses 100 and 300 perform the capture processing as with step S200 of FIG. 6 (S400).

As with step S202 of FIG. 6, the information processing apparatus 100 transmits the state information indicating information acquisition waiting to the information processing apparatus 300 (S302).

The information processing apparatus 300 having received the state information transmitted from the information processing apparatus 100 in step S402 transmits the connection setting information to the information processing apparatus 100 as with the step S204 of FIG. 6 (S404). The transmission of the connection setting information of step S404 corresponds to the communication request from the information processing apparatus 300 to the information processing apparatus 100, according to embodiments.

The information processing apparatus 100 having received the connection setting information transmitted in step S404 determines whether or not the received information (data) can be processed as with step S206 of FIG. 6 (S406: data determination processing). As with step S208 of FIG. 6, the information processing apparatus 100 transmits the processing result in step S406 to the information processing apparatus 300 (S408). When it is determined that the received connection setting information can be processed in the processing of step S406, the processing result transmitted in step S408 corresponds to the communication request from the information processing apparatus 100 to the information processing apparatus 300, according to an embodiments.

In the information processing apparatuses 100 and 300, the connection setting information is transmitted and received by the processing shown in FIG. 8.

[4] Fourth Example

Figure 9:
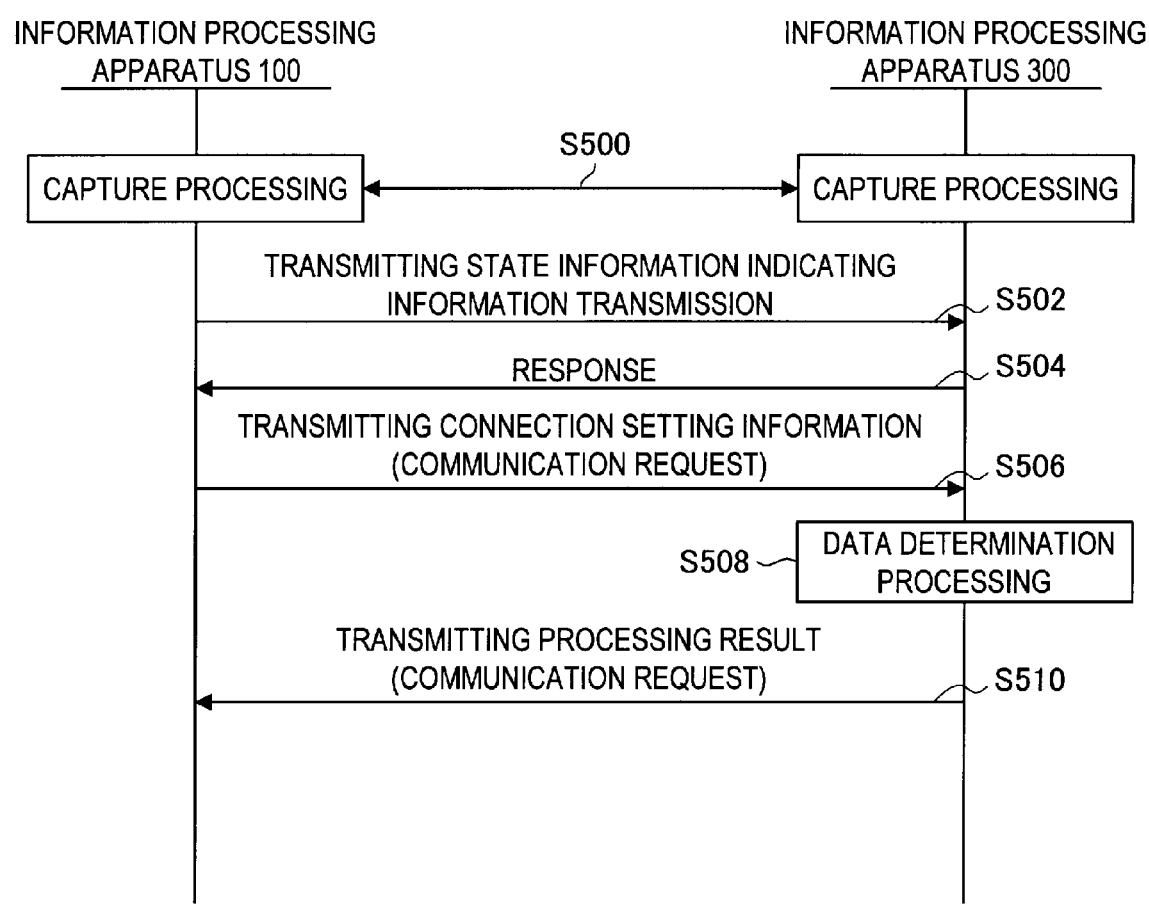
FIG. 9 is an explanatory view showing an example of communication through a first communication path according to the embodiments.

FIG. 9 is an explanatory view showing an example of the communication through the first communication path according to the embodiments and shows the fourth example of the connection setting information exchange processing according to the embodiments. FIG. 9 shows an example in which the information processing apparatus 100 is set in a state of transmitting data to an external apparatus by the setting operation performed by the user of the information processing apparatus 100, and the information processing apparatus 100 serves as a reader/writer.

When the information processing apparatus 300 is held over the information processing apparatus 100, the information processing apparatuses 100 and 300 perform the capture processing as with step S200 of FIG. 6 (S500).

As with step S302 of FIG. 7, the information processing apparatus 100 transmits the state information indicating information transmission to the information processing apparatus 300 (S502).

The information processing apparatus 300 having received the state information transmitted from the information processing apparatus 100 in step S502 performs a response, showing that the state information has been normally received, to the information processing apparatus 100 as with step S304 of FIG. 7 (S504).

The information processing apparatus 100 having received the response transmitted from the information processing apparatus 300 in step S504 transmits the connection setting information to the information processing apparatus 300 as with step S204 of FIG. 6 (S506). The transmission of the connection setting information of step S506 corresponds to the communication request from the information processing apparatus 100 to the information processing apparatus 300, according to embodiments.

The information processing apparatus 300 having received the connection setting information transmitted in step S506 determines whether or not the received information (data) can be processed as with step S206 of FIG. 6 (S508: data determination processing). As with step S208 of FIG. 6, the information processing apparatus 300 transmits the processing result in step S508 to the information processing apparatus 100 (S510). When it is determined that the received connection setting information can be processed in the processing of step S508, the processing result transmitted in step S510 corresponds to the communication request from the information processing apparatus 300 to the information processing apparatus 100, according to embodiments.

In the information processing apparatuses 100 and 300, the connection setting information is transmitted and received by the processing shown in FIG. 9.

[5] Other Example

The first to fourth examples show the connection setting information exchange processing in the information processing apparatuses 100 and/or 300 in the case where the user performs the predetermined setting operation. However, the connection setting information exchange processing according to embodiments is not limited to the above cases.

For example, in the information processing system 1000 according to the embodiments, the information processing apparatus serving as a reader/writer in the communication through the first communication path can transmit the connection setting information to the other information processing apparatus. Further, in the information processing system 1000, the information processing apparatus serving as a reader/writer in the communication through the first communication path can transmit information acquisition request requesting the connection setting information to the other information processing apparatus. Also in those cases, the information processing system 1000 can realize the transmission and reception of the connection setting information between the information processing apparatuses as with the first to fourth examples.

The connection setting information exchange processing shown in step S104 of FIG. 5 can be realized between the information processing apparatuses 100 and 300 by performing the processing shown in the above [1] to [5].

The processing for realizing the convenience enhancement approach according to the embodiments is described with reference to FIG. 5, again. The information processing apparatus 100 stores the connection state information about the second communication with the information processing apparatus 200, based on the communication request obtained from the information processing apparatus 300 in the processing of step S104 (S106). In the example of FIG. 5, the information processing apparatus 100 stores the connection state information based on the communication request obtained in step S104; however, the example is not limited to this. For example, the information processing apparatus 100 can store the connection setting information when it is determined that the predetermined setting operation performed by a user is performed based on the predetermined setting operation.

When the connection setting information is stored in step S106, the information processing apparatus 100 stops the communication with the information processing apparatus 200 through the second communication path (S108: communication cutoff processing). The information processing apparatus 100 then performs setting related to the communication with the information processing apparatus 300 through the second communication path based on the connection setting information obtained from the information processing apparatus 300 in step S104 or the connection setting information transmitted to the information processing apparatus 300 (S110: connection setting processing).

Meanwhile, the information processing apparatus 300 performs setting related to the communication with the information processing apparatus 100 through the second communication path based on the connection setting information obtained from the information processing apparatus 100 in step S104 or the connection setting information transmitted to the information processing apparatus 100 (S112: connection setting processing). In FIG. 5, the connection setting processing in the information processing apparatus 300 (step S112) is performed after steps S106 and S108 in the information processing apparatus 100; however, it is not limited to this. Since the information processing apparatus 300 can perform the processing of step S112 independently from the information processing apparatus 100, the information processing apparatus 300 can perform the processing of step S112 at an arbitrary timing after the processing of step S104, for example.

The processing of step S110 is performed in the information processing apparatus 100, and the processing of step S112 is performed in the information processing apparatus 300, whereby the communication between the information processing apparatuses 100 and 300 through the second communication path can be realized. The information processing apparatus 100 can switch the communication with the information processing apparatus 200 through the second communication path to the communication with the information processing apparatus 300 through the second communication path by the processing from steps S104 to S110. In the following steps S114 to S124 of FIG. 5, the information processing apparatus 100 transmits data to the information processing apparatus 300 through the second communication path, but the example is not limited to this.

The information processing apparatus 100 transmits data transmission start notification to the information processing apparatus 300 (S114).

The information processing apparatus 300, which has received the data transmission start notification transmitted from the information processing apparatus 100 in step S114, transmits a response, showing reception of the data transmission start notification, to the information processing apparatus 100 (S116).

The information processing apparatus 100 having received the response transmitted from the information processing apparatus 300 in step S116 transmits data to the information processing apparatus 300 (S118).

The information processing apparatus 300 having received the data transmitted from the information processing apparatus 100 in step S118 transmits the reception result to the information processing apparatus 100 (S120). When the data transmitted from the information processing apparatus 100 in step S118 is not normally received by the information processing apparatus 300, the information processing apparatus 300 can transmit as the reception result the error information showing an error and a retransmission request requesting retransmission of the data.

In FIG. 5, the data transmission/reception between the information processing apparatuses 100 and 300 is performed once; however, the number of data transmission/reception is not limited to one. For example, the information processing apparatuses 100 and 300 mutually repeat the processing from steps S114 to S120, whereby the data transmission/reception can be performed arbitrary times.

When the information processing apparatus 100 has received the reception result transmitted from the information processing apparatus 300 in step S120, the information processing apparatus 100 determines whether or not the data transmission is normally completed based on the reception result. When it is determined that the data transmission is normally completed, the information processing apparatus 100 transmits data transmission termination notification showing termination of data transmission to the information processing apparatus 300 (S122).

The information processing apparatus 300, which has received the data transmission termination notification transmitted from the information processing apparatus 100 in step S122, transmits a response for the data transmission termination notification to the information processing apparatus 100 (S124).

The information processing apparatus 100, which has received the response transmitted from the information processing apparatus 300 in step S124, determines that the communication with the information processing apparatus 300 through the second communication path is terminated. The information processing apparatus 100 then performs a connection switching processing for communicating with the information processing apparatus 200 through the second communication path based on the connection state information about the second communication with the information processing apparatus 200 stored in step S106 (S126). The information processing apparatus 100 stops the communication with the information processing apparatus 300 through the second communication path by a processing similar to the communication cutoff processing shown in step S108. The information processing apparatus 100 then performs a processing similar to the connection setting processing shown in step S110 with the use of the connection state information stored in step S106 and consequently performs a connection setting for communicating with the information processing apparatus 200 through the second communication path. According to the above processing, the information processing apparatus 100 can switch the communication through the second communication path from the communication with the information processing apparatus 300 to the communication with the information processing apparatus 200.

When the information processing apparatus 300 transmits the response in step S124, the information processing apparatus 300 performs the connection switching processing for communicating with the external apparatus through the second communication path based on the connection state information stored in step S102 (S128). At that time, the information processing apparatus 300 performs the connection switching processing by the processing similar to that of step S126 in the information processing apparatus 100. In FIG. 5, the communication processing after switching the communication through the second communication path in the information processing apparatus 300 is omitted. Further, in FIG. 5, the information processing apparatus 300 communicates with the external apparatus through the second communication path; however, the example is not limited to this. For example, when the information processing apparatus 300 does not store the connection state information, the processing of step S128 can be replaced with a processing for stopping the communication with the information processing apparatus 300 through the second communication path (communication cutoff processing).

When the connection switching processing is performed in step S126, the information processing apparatus 100 communicates with the information processing apparatus 200 through the second communication path (S130).

As shown in FIG. 5, the information processing apparatus 100 switches the communication through the second communication path from the information processing apparatus 200 to the information processing apparatus 300, and when the communication with the information processing apparatus 300 is terminated, the information processing apparatus 100 switches the communication through the second communication path from the information processing apparatus 300 to the information processing apparatus 200. The information processing apparatus 100 stores the connection state information about the second communication with the information processing apparatus 200 before switching the communication through the second communication path from the information processing apparatus 200 to the information processing apparatus 300. When the communication between the information processing apparatuses 100 and 300 is terminated, based on the stored connection state information, the information processing apparatus 100 seamlessly changes its communication partner into the information processing apparatus 200, which has been in communication with the information processing apparatus 100 before communication partner switching. Thus, in the communication between the information processing apparatuses 100 and 200 after the switching, a user of the information processing apparatus 100 does not have to perform the setting operation for performing communication through the second communication path unlike the case of using the related art information processing apparatus. Thus, in the case where the information processing apparatus 100 switches its communication partner, the information processing apparatus 100 may enhance the convenience of a user by changing its communication partner back into the external apparatus, its former partner, which has been in communication with it before communication partner switching.

In the information processing system 1000, the information processing apparatus constituting the information processing system 1000, according to the embodiments, performs the processing shown in the processing in the information processing apparatuses 100 and 300 of FIG. 5, whereby the convenience enhancement approach according to the embodiments can be realized. Needless to say, the processing for realizing the convenience enhancement approach according to embodiments is not limited to the example shown in FIG. 5.

(The Information Processing Apparatus According to Embodiments)

There is described the constitution of the information processing apparatus according to the embodiments which can realize the convenience enhancement approach according to the embodiments. In the following example of the constitution of the information processing apparatus according to the embodiments, the information processing apparatus 100 is used. Since other information processing apparatuses according to the embodiments such as the information processing apparatus 300 can have the same constitution as that of the information processing apparatus 100 to be described hereinafter, the description is omitted.

Figure 10:
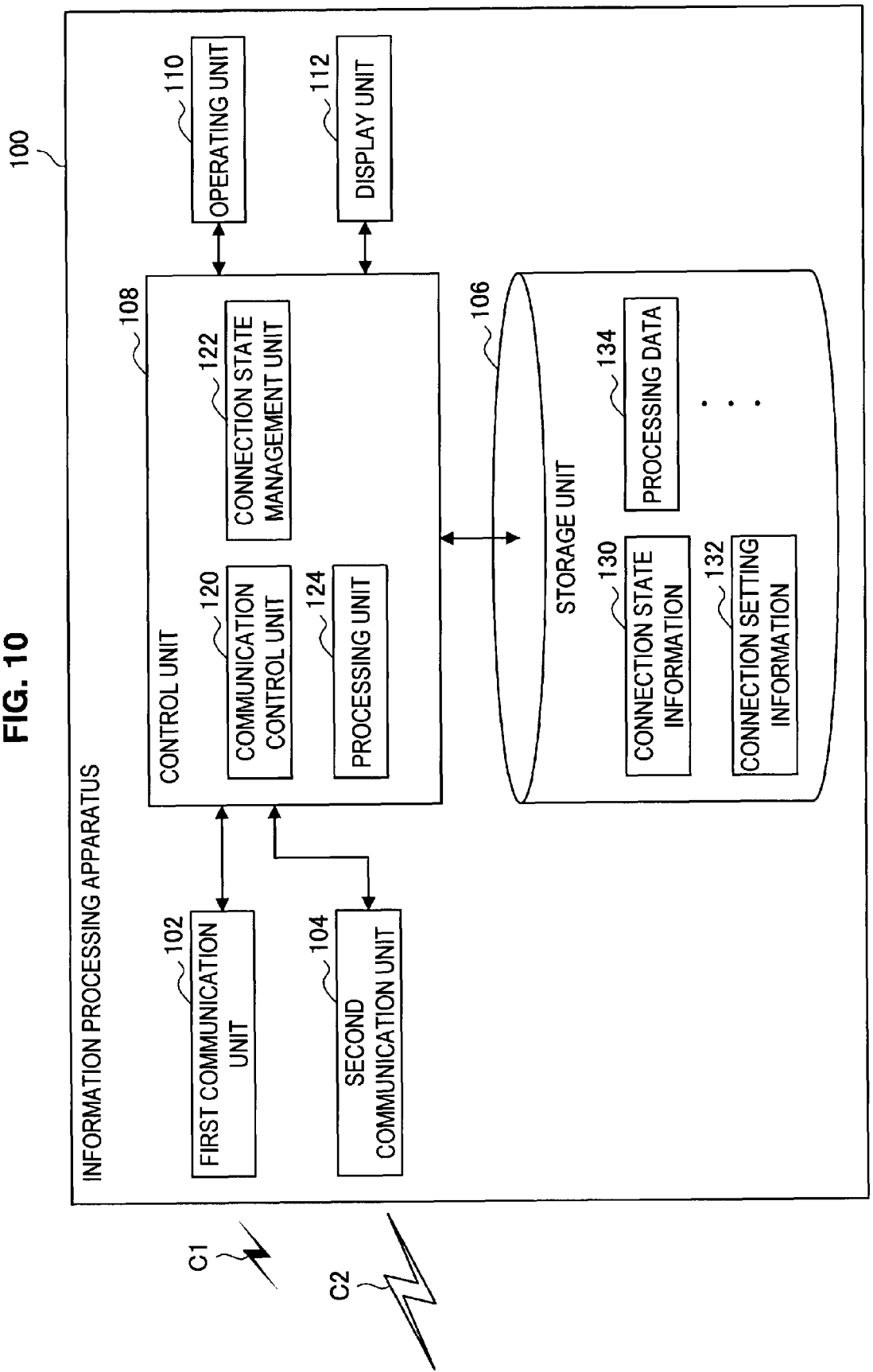
FIG. 10 is an explanatory view showing an example of a constitution of the information processing apparatus according to the embodiments.

FIG. 10 is an explanatory view showing an example of the constitution of the information processing system 100 according to embodiments.

The information processing apparatus 100 is provided with a first communication unit 102, a second communication unit 104, a storage unit 106, a control unit 108, an operating unit 110, and a display unit 112.

The information processing apparatus 100 may have, for example, a read only memory (ROM; not shown) and a random access memory (RAM: not shown). The information processing apparatus 100 can connect the respective components through a bus as a transmission path of data. The ROM stores control data such as a program and an operation parameter used by the control unit 108. The RAM temporarily stores a program executed by the control unit 108.

[An Example of a Hardware Configuration of the Information Processing Apparatus 100]

Figure 11:
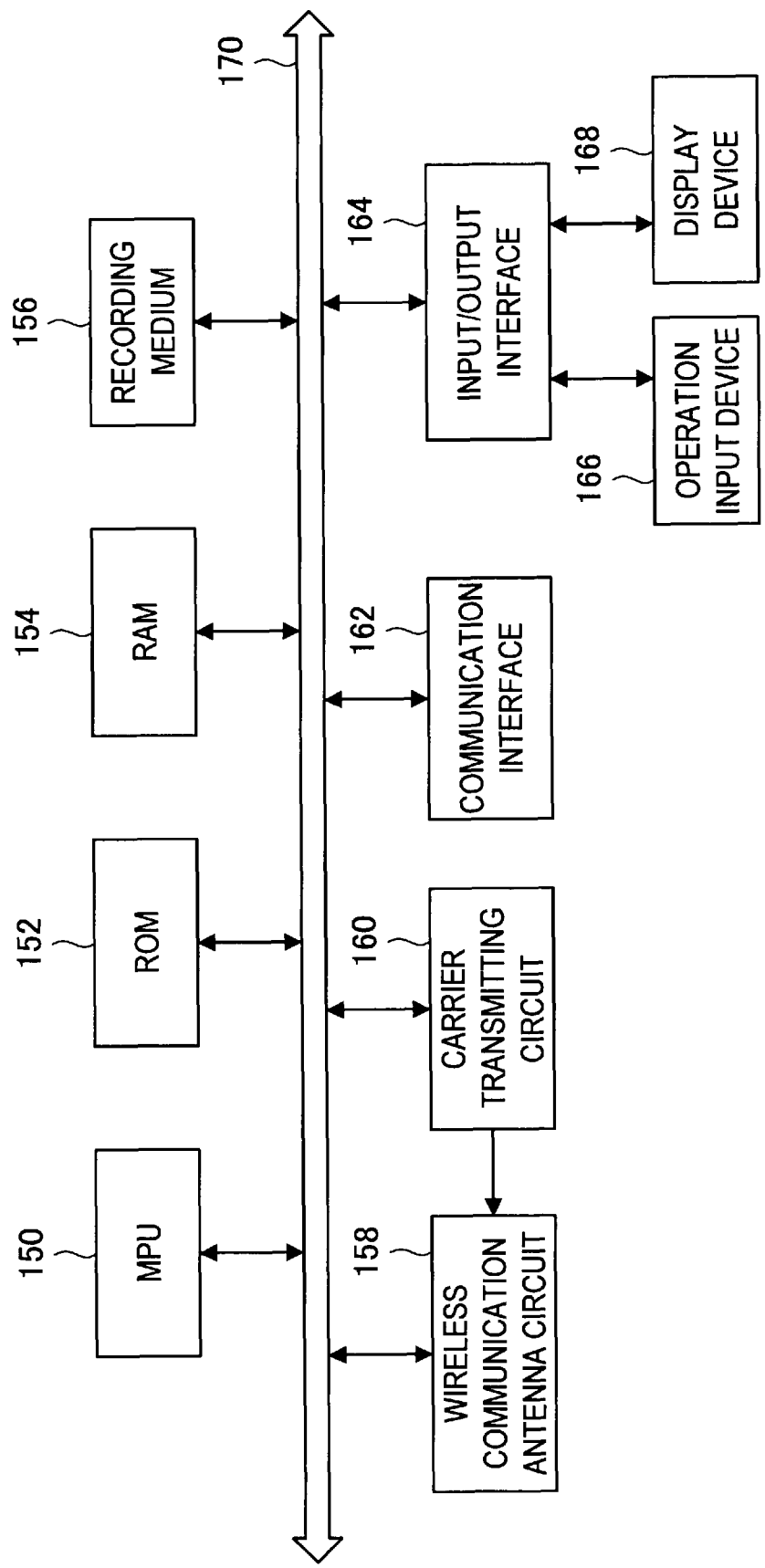
FIG. 11 is an explanatory view showing an example of a hardware configuration the information processing apparatus according to the embodiments.

FIG. 11 is an explanatory view showing an example of a hardware configuration of the information processing apparatus 100 according to the embodiments. Referring to FIG. 11, the information processing apparatus 100 is provided with, for example, an MPU 150, a ROM 152, a RAM 154, a recording medium 156, a wireless communication antenna circuit 158, a carrier transmitting circuit 160, a communication interface 162, an input/output interface 164, an operation input device 166, and a display device 168. The information processing apparatus 100 connects the respective components through a bus 170 as a transmission path of data.

The MPU 150 is constituted of an integrated circuit integrated with a micro processing unit (MPU) and a plurality of circuits for realizing a control function and is operated as the control unit 108 controlling the overall operation of the information processing apparatus 100. In the information processing apparatus 100, the MPU 150 can serve as a communication control unit 120, a connection state management unit 122, and a processing unit 124 to be described later.

The ROM 152 stores control data such as a program and an operation parameter used by the MPU 150. The RAM 154 temporarily stores a program executed by the MPU 150.

The recording medium 156 is operated as the storage unit 106 and stores various data (information) such as the connection state information, processing data including image data and audio data, and application. The recording medium 156 includes a magnetic recording medium such as a hard disk and a nonvolatile memory such as an electrically erasable and programmable read only memory (EEPROM), a flash memory, and an magnetoresistive random access memory (MRAM), a ferroelectric random access memory (FeRAM), and a phase change random access memory (PRAM); however, the examples are not limited to those.

The wireless communication antenna circuit 158 and the carrier transmitting circuit 160 are the first communication means of the information processing apparatus 100 and are operated as the first communication unit 102 which communicates with an external apparatus through the first communication path.

The wireless communication antenna circuit 158 is constituted of, for example, a resonant circuit, a demodulation circuit and a load modulation circuit. The resonant circuit is constituted of a coil, which serves as a transmission/reception antenna and has a predetermined inductance, and a capacitor having a predetermined capacity. The wireless communication antenna circuit 158 transmits the carrier and detects a change of voltage occurring at an end of a transmission/reception antenna (change due to a diamagnetic field) in response to the load modulation in an external apparatus, for example, whereby a response from the external apparatus is taken as a signal (when the information processing apparatus 100 is operated as a reader/writer). In a load modulation circuit constituted of, for example, a load resistance and a switching circuit, the wireless communication antenna circuit 158 selectively renders the load resistance effective (connects the load resistance) and consequently transmits a response signal based on the load modulation to the external apparatus (when the information processing apparatus 100 is not operated as a reader/writer). Although not shown in FIG. 11, the information processing apparatus 100 can be provided with an IC chip integrated with various circuits for realizing the communication with an external apparatus through the first communication path.

The carrier transmitting circuit 160 is provided with a modulation circuit performing amplitude shift keying (ASK) modulation and an amplifying circuit amplifying an output of the modulation circuit and transmits the carrier carrying a carrier signal from the transmission/reception antenna of the wireless communication antenna circuit 158. The information processing apparatus 100 is provided with the carrier transmitting circuit 160 and consequently can have a so-called reader/writer function. The carrier signal transmitted from the wireless communication antenna circuit 158 by the carrier transmitting circuit 160 includes a signal related to polling, a signal showing the state information, and a signal showing the connection setting information. The transmission of the carrier from the carrier transmitting circuit 160 is controlled by, for example, the MPU 150.

The communication interface 162 is the second communication means of the information processing apparatus 100 and is operated as the second communication unit 104 communicating with an external apparatus through the second communication path. The communication interface 162 includes an IEEE802.15.1 port and a transmission/reception circuit, an IEEE802.11b port and a transmission/reception circuit, or a LAN terminal and a transmission/reception circuit: however, the communication interface 162 is not limited to those.

The input/output interface 164 connects, for example, the operation input device 166 and the display device 168. The operation input device 166 is operated as the operating unit 110, and the display device 168 is operated as the display unit 112. The input/output interface 164 includes a universal serial bus (USB) terminal, a digital visual interface (DVI) terminal, and a high-definition multimedia interface (HDMI) terminal; however, the input/output interface 164 is not limited to those. The operation input device 166 is provided on, for example, the information processing apparatus 100 and connected to the input/output interface 164 in the information processing apparatus 100. The operation input device 166 includes a button, a direction key, a rotary selector such as a jog dial, and the combination thereof; however, the operation input device 166 is not limited to those. The display device 168 is provided on, for example, the information processing apparatus 100 and connected to the input/output interface 164 in the information processing apparatus 100. The display device 168 includes a liquid crystal display (LCD), an organic electroluminescence display (organic EL display, or also called an organic light emitting diode display (OLED display)); however, the display device 168 is not limited to those. Needless to say, the input/output interface 164 can be connected to an operation input device, serving as an external apparatus of the information processing apparatus 100 (for example, a keyboard and a mouse), and a display device (for example, an external display).

The information processing apparatus 100 performs the processing realizing the convenience enhancement approach according to embodiments by the hardware configuration shown in FIG. 11. Needless to say, the constitution of the information processing apparatus 100 according to the embodiments is not limited to the constitution shown in FIG. 11.

Referring to FIG. 10 again, the components of the information processing apparatus 100 are described. The first communication unit 102 communicates with an external apparatus through the first communication path. More specifically, when the information processing apparatus 100 is operated as a reader/writer, the first communication unit 102 transmits a carrier with a predetermined frequency such as 13.56 MHz to communicate with the external apparatus in a noncontact manner. When the information processing apparatus 100 is not operated as a reader/writer, the first communication unit 102 receives the carrier transmitted from the external apparatus, performs the load modulation in response to the reception result to thereby transmit the response signal to the external apparatus, and consequently communicates with the external apparatus in a noncontact manner. The first communication unit 102 is constituted of, for example, the wireless communication antenna circuit 158 and the carrier transmitting circuit 160. The communication with the external apparatus through the first communication path using the first communication unit 102 is controlled by, for example, the control unit 108 (more specifically, the communication control unit 120 to be described later).

The second communication unit 104 communicates with an external apparatus through the second communication path. The second communication unit 104 is constituted of, for example, an IEEE802.15.1 port and a transmission/reception circuit, an IEEE802.11b port and a transmission/reception circuit, or a LAN terminal and a transmission/reception circuit. The communication with the external apparatus thorough the second communication path using the second communication unit 104 is controlled by, for example, the control unit 108 (more specifically, the communication control unit 120 to be described later).

The storage unit 106 is the storage means of the information processing apparatus 100. The storage unit 106 includes a magnetic recording medium such as a hard disk and a nonvolatile memory such as a flash memory; however, the storage unit 106 is not limited to those.

The storage unit 106 stores various data (information) such as the connection state information, the connection setting information, processing data including image data and audio data, and application. In FIG. 10, connection state information 130, connection setting information 132, processing data 134, and so on are stored in the storage unit 106; however, the example is not limited to this. The information processing apparatus 100 can store (hold) the connection state information and the connection setting information in the RAM 154.

The control unit 108 is constituted of, for example, an MPU and serves to control the overall operation of the information processing apparatus 100. The control unit 108 is provided with the communication control unit 120, the connection state management unit 122, and the processing unit 124 and serves to mainly perform the processing for realizing the convenience enhancement approach according to embodiments.

The communication control unit 120 controls the communication through the first communication path using the first communication unit 102 and the communication through the second communication path using the second communication unit 104.

Hereinafter, a specific example of the control of communication in the communication control unit 120 is described. The communication control unit 120 controls the first communication unit 102 to cause polling and the load modulation to be repeated. The communication control unit 120 determines whether or not the first communication unit 102 serves as a reader/writer at the time when it is possible to perform the communication with the external apparatus through the first communication path and causes the first communication unit 102 to perform the operation based on the determination.

The communication control unit 120 starts the communication through the second communication path with the external apparatus (hereinafter may be referred to as a "second external apparatus"), which has transmitted the communication request, based on the communication request received by the first communication unit 102.

The communication control unit 120 switches the communication partner for the information processing apparatus 100 to communicate with through the second communication path, according to the state of communication through the second communication path at the time when the first communication unit 102 receives the communication request. For example, the time when the communication request according to the embodiments is received may be the time point when the communication request is received; however, the time is not limited to this. For example, the time when the communication request according to the embodiments is received may be before the communication request is received (for example, from the time point when the communication request is received from a time point before a predetermined time). More specifically, when the communication with the external apparatus through the second communication path is performed at the time when the communication request is received, the communication control unit 120 changes the communication partner for the information processing apparatus 100 to communicate with through the second communication path from the external apparatus in communication to the second external apparatus, which has transmitted the communication request. Hereinafter, the external apparatus in communication—the external apparatus which is the communication partner before communication partner switching in respect to communication through the second communication path—may also be referred to as a "first external apparatus."

When the communication with the second external apparatus through the second communication path is terminated, the communication control unit 120 starts the communication with the external apparatus, shown in the connection state information, through the second communication path based on the connection state information. Thus, the communication partner on the second communication path is switched from the second external apparatus to an external apparatus specified by the connection state information. The connection state information is managed by the connection state management unit 122. More specifically, the connection state management unit 122 holds the connection state information corresponding to the external apparatus, which has communicated with the information processing apparatus 100 through the second communication path when the communication request is received. Thus, by use of the held (stored) connection state information, the communication control unit 120 may switch the communication partner for the information processing apparatus 100 to communicate with through the second communication path from the second external apparatus to the first external apparatus.

More specifically, when the communication with the second external apparatus through the second communication path is terminated, the communication control unit 120 determines whether the connection state information is stored in the information processing apparatus 100. When the connection state information is stored in the information processing apparatus 100, the information processing apparatus 100 switches its communication partner on the second communication path from the second external apparatus to an external apparatus specified by the connection state information. When the connection state information is not stored in the information processing apparatus 100, the information processing apparatus 100 terminates the communication through the second communication path.

The communication control unit 120 performs the above processing to thereby control the communication through the first communication path using the first communication unit 102 and the communication through the second communication path using the second communication unit 104. The communication control unit 120 performs the above processing and consequently can perform a communication control (a communication control method) for realizing the convenience enhancement approach according to the embodiments. Needless to say, the processing performed by the communication control unit 120 is not limited to the above processing.

The connection state management unit 122 generates the connection state information and holds (stores) the generated connection state information in, for example, the storage unit 106 and the RAM 154.

More specifically, in response to the reception of the communication request in the first communication unit 102, the connection state management unit 122 determines whether or not the communication through the second communication path is performed when the communication request is received. When the connection state management unit 122 determines that the communication through the second communication path is performed when the communication request is received, the connection state management unit 122 generates the connection state information corresponding to the first external apparatus. The connection state management unit 122 holds (stores) the generated connection state information corresponding to the first external apparatus in, for example, the storage unit 106 and the RAM 154. When it is not determined that the communication through the second communication path is performed when the communication request is received, the connection state management unit 122 does not generate the connection state information, for example.

Note that, the connection state management unit 122 can uniquely generate connection state information in response to the reception of the communication request in the first communication unit 102, without performing the above determination. In the above case, for example when the communication through the second communication path is not performed when the communication request is received, the connection state information generated by the connection state management unit 122 is information free from the connection state information. When the information generated by the connection state management unit 122 is the information free from the connection state information, the communication control unit 120 terminates the communication through the second communication path after the termination of the communication with the second external apparatus through the second communication path.

When a predetermined setting operation (for example, a user's operation) is performed in the operating unit 110, the connection state management unit 122 generates the connection state information based on the predetermined setting operation in the operating unit 110 to hold the generated connection state information. The predetermined setting operation in the operating unit 110 includes a setting operation for setting either transmission of data to an external apparatus or reception of data from the external apparatus; however, the operation is not limited to this.

The connection state management unit 122 performs the above processing to thereby selectively generate the connection state information and holds (stores) the connection state information in, for example, the storage unit 106 and the RAM 154. The processing performed by the connection state management unit 122 is not limited to the above. For example, when the communication control unit 120 switches, based on the connection state information, the communication partner on the second communication path, the connection state management unit 122 may remove the connection state information. The connection state management unit 122 performs the processing related to management of the connection state information, whereby the information processing apparatus 100 can more accurately switch its communication partner to communicate with through the second communication path.

The processing unit 124 performs various processing such as a processing related to control of the overall operation of the information processing apparatus 100 and a processing related to data obtained from an external apparatus. The processing performed by the processing unit 124 includes a processing related to a device control of the operating unit 110 and the display unit 112 and a processing of data obtained from an external apparatus through the first communication unit 102 and the second communication unit 104; however, the processing is not limited to those.

The control unit 108 is provided with, for example, the communication control unit 120, the connection state management unit 122, and the processing unit 124 and consequently can mainly perform the processing (the processing according to the communication control method of the embodiments) for realizing the convenience enhancement approach according to embodiments.

The operating unit 110 is an operating means of the information processing apparatus 100, which can realize the operation by a user. The information processing apparatus 100 is provided with the operating unit 110 and consequently can perform a processing desired by the user of the information processing apparatus 100 such as the above predetermined setting operation and selection of data to be transmitted to an external apparatus. The operating unit 110 includes an operation input device such as a keyboard and a mouse, a button, a direction key, a rotary selector such as a jog dial, and the combination thereof; however, the operating unit 110 is not limited to those.

The display unit 112 is a display means of the information processing apparatus 100 and displays various information on a display screen. A screen displayed on the display screen of the display unit 112 includes a display screen on which the icons of FIGS. 3 and 4A to 4C are displayed and an operation screen for causing the information processing apparatus 100 to perform a desired operation. The display unit 112 may be an LCD and an organic EL display; however, it is not limited to those. For example, in the information processing apparatus 100, the display unit 112 can be constituted of a touch screen. In that case, the display unit 112 is operated as an operation display unit allowing both operation by a user and display.

The information processing apparatus 100 can perform the processing for realizing the convenience enhancement approach according to the embodiments by virtue of the configuration shown in FIG. 10. Thus, when the information processing apparatus 100 switches the communication partner of the information processing apparatus 100, the information processing apparatus 100 may change its communication partner back into the external apparatus, its former partner, which has been in communication with it before communication partner switching, whereby the convenience of users can be enhanced.

As described above, the information processing apparatus 100 according to the embodiments of the application starts the communication with the second external apparatus through the second communication path based on the communication request transmitted from the second external apparatus through the first communication path. When the information processing apparatus 100 is communicating with the first external apparatus through the second communication path at the time when receiving the communication request, the information processing apparatus 100 switches its communication partner on the second communication path from the first external apparatus to the second external apparatus. When the information processing apparatus 100 switches its communication partner to communicate with through the second communication path, the information processing apparatus 100 stores the connection state information about communication with the first external apparatus, which has been in communication with the information processing apparatus 100 before communication partner switching. When the communication through the second communication path is terminated between the information processing apparatus 100 and the second external apparatus, which is its communication partner after communication partner switching, the information processing apparatus 100 returns from the communication through the second communication path back to the communication with the first external apparatus, its former partner, based on the stored connection state information. Thus, in the communication between the information processing apparatus 100 and the second external apparatus after the switching, the user of the information processing apparatus 100 does not have to perform the setting operation for performing communication through the second communication path, unlike the case of using the related art information processing apparatus. Accordingly, when the information processing apparatus 100 switches its communication partner, it may change its communication partner back to the external apparatus, its former partner, which has been in communication with it before communication partner switching, and then, such switch processing may enhance the convenience of a user.

When the information processing apparatus 100 communicates with an external apparatus, the icons shown in FIGS. 3 and 4 are displayed on the display screen, whereby the information about the state of data transmission/reception is transmitted to a user in a visual information form, for example. The information about the state of data transmission/reception is transmitted, whereby the user can recognize the state of data transmission/reception, and therefore, the information processing apparatus 100 can further enhance the convenience of users.

The information processing system 1000 according to the embodiments has one or two or more information processing apparatuses according to the embodiments, which have the same constitution as the information processing apparatus 100. Thus, by virtue of the constitution, in the case where a communication partner has been switched with another communication end, the other communication end may be switched with the former communication partner, which has been in communication with the information processing apparatus before communication partner switching, and then, such switch processing may realize an information processing system for enhancing the convenience of a user.

Although the information processing apparatuses 100, 200, and 300 have been described as the components of the information processing system 1000 according to the embodiments, the embodiments are not limited to those. The embodiments can be applied to various apparatus including a mobile communication apparatus such as a cell phone and a personal handyphone system (PHS), a video/audio reproducing apparatus such as a Walkman (Trade Mark), a portable game player such as a PlayStation Portable (Trade Mark), a computer such as a personal digital assistant (PDA) and a laptop computer, and an audio output device such as a headphone and a speaker.

(A Program According to the Information Processing Apparatus in Embodiments)

By virtue of a program for causing a computer to function as the information processing apparatus of the embodiments, in the case where the communication partner of the information processing apparatus has been switched with another communication end, the other communication end may be switched with the former communication partner, which has been in communication with the information processing apparatus before communication partner switching, whereby the convenience of a user may be enhanced.

It should be understood by those skilled in the art that various modifications, combinations, sub-combinations and alterations may occur depending on design requirements and other factors insofar as they are within the scope of the appended claims or the equivalents thereof.

In the above constitution, the information processing apparatus according to the embodiments communicates with the external apparatus through the two communication paths, as shown in FIG. 10. However, the constitution of the information processing apparatus according to the embodiments is not limited thereto. For example, the information processing apparatus according to the embodiments may communicate with the external apparatus through three or more communication paths. Also in this case, for example when the communication request transmitted from the external apparatus is received, the information processing apparatus according to the embodiments can store the connection state information about the communication partners on respective communication paths. Thus, even when the information processing apparatus communicates with external apparatuses through three or more communication paths, an information processing apparatus according to embodiments may achieve the same advantages as the information processing apparatus 100 according to embodiments.

In the above description, there is provided the program (computer program) for causing the computer to function as the information processing apparatus 100 according to embodiments; however, embodiments can provide a storage medium stored with the program.

The above-mentioned configurations represent exemplary embodiments, of course belonging to the technical scope.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising:
   a first communication unit for performing non-contact communication with a first or second external apparatus through a first communication path;
   a second communication unit for performing communication with the first or second external apparatus through a second communication path different from the first communication path;
   a communication control unit for controlling the second communication unit to start communication with the second external apparatus through the second communication path, based on a communication request for starting communication through the second communication path, the communication request transmitted by the second external apparatus and received by the first communication unit; and
   a connection state management unit for managing connection state information to be held in response to reception of the communication request by the first communication unit, the connection state information indicating a state of communication with the first external apparatus through the second communication path at the reception of the communication request,
   wherein the communication control unit controls the second communication unit to start, through the second communication path, communication with the first external apparatus specified by the connection state information when communication with the second external apparatus through the second communication path is terminated.

2. The information processing apparatus according to claim 1, wherein the communication control unit switches communication through the second communication path from communication with the first external apparatus to communication with the second external apparatus if the second communication unit is in communication with the first external apparatus through the second communication path when the first communication unit receives the communication request from the second external apparatus.

3. The information processing apparatus according to claim 2, wherein the communication control unit switches communication through the second communication path from communication with the second external apparatus to communication with the first external apparatus, based on the connection state information, when communication with the second external apparatus through the second communication path is terminated.

4. The information processing apparatus according to claim 1, wherein the connection state management unit manages the connection state information to be held if the second communication unit is in communication with the first external apparatus through the second communication path when the first communication unit receives the communication request.

5. The information processing apparatus according to claim 1, further comprising an operating unit operable on settings whether to transmit data to the second external apparatus or receive data from the second external apparatus.

6. The information processing apparatus according to claim 5, wherein the connection state management unit manages the connection state information to be held, based on the settings operated by the operating unit.

7. A communication control method comprising:
   determining whether a communication request for starting communication through a second communication path different from a first communication path, the communication request transmitted from a second external apparatus through the first communication path;
   holding connection state information indicating a state of communication with a first external apparatus through the second communication path at the reception of the communication request if the communication request is determined to have been received in the step of determining;
   starting communication with the second external apparatus through the second communication path if the communication request is determined to have been received in the step of determining; and
   starting, through the second communication path, communication with the first external apparatus specified by the connection state information held in the step of holding when communication with the second external apparatus through the second communication path is terminated.

8. A storage medium with a program stored therein, the program configured to cause a computer to execute the steps of:
   determining whether a communication request for starting communication through a second communication path different from a first communication path, the communication request transmitted from a second external apparatus through the first communication path;
   holding connection state information indicating a state of communication with a first external apparatus through the second communication path at the reception of the communication request if the communication request is determined to have been received in the step of determining;

starting communication with the second external apparatus through the second communication path if the communication request is determined to have been received in the step of determining; and starting, through the second communication path, communication with the first external apparatus specified by the connection state information held in the step of holding when communication with the second external apparatus through the second communication path is terminated.

9. An information processing system comprising a plurality of information processing apparatuses operable to perform non-contact communication through a first communication path, wherein each of the plurality of information processing apparatuses includes a first communication unit for performing non-contact communication with a first or second external apparatus through a first communication path, a second communication unit for performing communication with the first or second external apparatus through a second communication path different from the first communication path, a communication control unit for controlling the second communication unit to start communication with the second external apparatus through the second communication path, based on a communication request for starting communication through the second communication path, the communication request transmitted by the second external apparatus and received by the first communication unit, and a connection state management unit for managing connection state information to be held in response to reception of the communication request by the first communication unit, the connection state information indicating a state of communication with the first external apparatus through the second communication path at the reception of the communication request, and wherein the communication control unit controls the second communication unit to start, through the second communication path, communication with the first external apparatus specified by the connection state information when communication with the second external apparatus through the second communication path is terminated.

* * * * *